(12) United States Patent
Nobbs et al.

(10) Patent No.: US 12,327,899 B2
(45) Date of Patent: Jun. 10, 2025

(54) CELL UNIT AND CELL STACK

(71) Applicant: Ceres Intellectual Property Company Limited, Horsham (GB)

(72) Inventors: Christopher James Nobbs, Horsham (GB); Ameir Alexander Mahgoub, Horsham (GB); Jonathan Harman, Horsham (GB); Tomasz Domanski, Horsham (GB)

(73) Assignee: Ceres Intellectual Property Company Limited, Horsham (GB)

( * ) Notice: Subject to any disclaimer, the term of this patent is extended or adjusted under 35 U.S.C. 154(b) by 349 days.

(21) Appl. No.: 17/781,351

(22) PCT Filed: Nov. 26, 2020

(86) PCT No.: PCT/EP2020/083553
§ 371 (c)(1),
(2) Date: May 31, 2022

(87) PCT Pub. No.: WO2021/110539
PCT Pub. Date: Jun. 10, 2021

(65) Prior Publication Data
US 2023/0006237 A1    Jan. 5, 2023

(30) Foreign Application Priority Data

Dec. 3, 2019    (GB) .................................... 1917650

(51) Int. Cl.
*H01M 8/2483*    (2016.01)
*H01M 8/0247*    (2016.01)
(Continued)

(52) U.S. Cl.
CPC ....... *H01M 8/2483* (2016.02); *H01M 8/0247* (2013.01); *H01M 8/0258* (2013.01);
(Continued)

(58) Field of Classification Search
CPC ............. H01M 8/2483; H01M 8/2432; H01M 8/0247; H01M 8/0258; H01M 8/1226; H01M 8/1286; H01M 2008/1293
See application file for complete search history.

(56) References Cited

U.S. PATENT DOCUMENTS

| 5,922,485 A | 7/1999 | Yoshiaki |
| 6,066,408 A * | 5/2000 | Vitale .................... H01M 8/021 |
| | | 429/456 |

(Continued)

FOREIGN PATENT DOCUMENTS

| CN | 101335354 A | 12/2008 |
| CN | 102449830 A | 5/2012 |

(Continued)

OTHER PUBLICATIONS

Machine Translation of WO-2016147799-A1 (Jan. 15, 2025) (Year: 2025).*

(Continued)

*Primary Examiner* — Matthew J Merkling
(74) *Attorney, Agent, or Firm* — Snell & Wilmer L.L.P.

(57) ABSTRACT

A stack of rectangular, planar electrochemical cell units (200), each cell unit (200) comprising at least one first fluid mid-port (230, 235) that is disposed midway along its length within or between one or more active cell chemistry regions (210) and is in fluid communication with a first fluid volume of the cell unit (200). The first fluid mid-ports (230, 235) of the respective cell units (200) align to form at least one first fluid mid-passageway extending in the stack direction. The stack is configured such that, in each first fluid volume, first fluid flow paths (405, 410) extend across the one or more active cell chemistry regions (210) between the at least one first fluid mid-port (230, 235) and each respective opposed cell end.

13 Claims, 17 Drawing Sheets

(51) Int. Cl.
  *H01M 8/0258* (2016.01)
  *H01M 8/12* (2016.01)
  *H01M 8/1226* (2016.01)
  *H01M 8/1286* (2016.01)
  *H01M 8/2432* (2016.01)
(52) U.S. Cl.
  CPC ....... *H01M 8/1226* (2013.01); *H01M 8/1286* (2013.01); *H01M 8/2432* (2016.02); *H01M 2008/1293* (2013.01)

(56) References Cited

U.S. PATENT DOCUMENTS

| | | | |
|---|---|---|---|
| 6,183,703 B1 | 6/2001 | Hsu et al. | |
| 2003/0059656 A1* | 3/2003 | Horiguchi | H01M 8/04228 429/444 |
| 2005/0136316 A1* | 6/2005 | Tsunoda | H01M 8/2432 429/511 |
| 2005/0142425 A1* | 6/2005 | Homma | H01M 8/0254 429/457 |
| 2006/0292433 A1* | 12/2006 | Ogawa | H01M 8/2425 429/514 |
| 2008/0096085 A1* | 4/2008 | Tsunoda | H01M 8/0247 429/457 |
| 2010/0297521 A1* | 11/2010 | Ogawa | H01M 8/2485 429/456 |
| 2011/0123890 A1 | 5/2011 | Miyazawa | |
| 2012/0052410 A1* | 3/2012 | Simpson | H01M 8/0258 429/479 |
| 2012/0295182 A1 | 11/2012 | Ishioka et al. | |
| 2013/0130139 A1 | 5/2013 | Kah et al. | |
| 2013/0177829 A1 | 7/2013 | Homma | |
| 2014/0197605 A1* | 7/2014 | Shimazoe | F16J 15/123 277/641 |
| 2019/0198902 A1* | 6/2019 | Ishida | H01M 8/026 |
| 2019/0305324 A1* | 10/2019 | Ichihara | H01M 8/12 |
| 2020/0119371 A1* | 4/2020 | Gu | H01M 8/0213 |
| 2020/0203740 A1* | 6/2020 | Takahata | H01M 8/04201 |
| 2020/0212470 A1* | 7/2020 | Baird | H01M 8/2483 |

FOREIGN PATENT DOCUMENTS

| | | |
|---|---|---|
| EP | 0405088 A1 | 2/1991 |
| EP | 3010076 A1 | 4/2016 |
| JP | 2003157865 A | 5/2003 |
| JP | 2004207152 A | 7/2004 |
| JP | 2006172896 A | 6/2006 |
| JP | 2013527564 A | 6/2013 |
| JP | 2013187005 A | 9/2013 |
| WO | 1999004446 A1 | 1/1999 |
| WO | 2001028009 A1 | 4/2001 |
| WO | 2005064725 A1 | 7/2005 |
| WO | 2008123968 A1 | 10/2008 |
| WO | 2015136295 A1 | 9/2015 |
| WO | WO-2016147799 A1 * | 9/2016 ............. H01M 8/02 |
| WO | WO-2023047101 A1 * | 3/2023 ............. C25B 1/04 |

OTHER PUBLICATIONS

WIPO; International Search Report and Written Opinion dated Feb. 26, 2021 in Application No. PCT/EP2020/083360.

* cited by examiner

CELL UNIT AND CELL STACK

CROSS-REFERENCE TO RELATED APPLICATIONS

This application is a national stage entry of International Patent Application No. PCT/EP2020/083553, filed 26 Nov. 2020, entitled "CELL UNIT AND CELL STACK," which claims priority to Great Britain Patent Application No. 1917650.2, filed on 3 Dec. 2019, the disclosures of which are hereby incorporated by reference in their entirety.

The present invention relates to a stack comprising a plurality of electrochemical cell units. The present invention more specifically relates to metal-supported cells, in particular, metal-supported solid oxide fuel cell units of either the oxidizer type (MS-SOFC) or electrolyser type (MS-SOEC), and stacks thereof.

Some fuel cell units can produce electricity by using an electrochemical conversion process that oxidises fuel to produce electricity. Some fuel cell units can also, or instead, operate as regenerative fuel cells (or reverse fuel cells) units, often known as solid oxide electrolyser fuel cell units, for example to separate hydrogen and oxygen from water, or carbon monoxide and oxygen from carbon dioxide. They may be tubular or planar in configuration. Planar fuel cell units may be arranged overlying one another in a stack arrangement, for example 100-200 fuel cell units in a stack, with the individual fuel cell units arranged electrically in series.

A solid oxide fuel cell that produces electricity is based upon a solid oxide electrolyte that conducts negative oxygen ions from a cathode to an anode located on opposite sides of the electrolyte. For this, a fuel, or reformed fuel, contacts the anode (fuel electrode) and an oxidant, such as air or an oxygen rich fluid, contacts the cathode (air electrode). Conventional ceramic-supported (e.g. anode-supported) SOFCs have low mechanical strength and are vulnerable to fracture. Hence, metal-supported SOFCs have recently been developed which have the active fuel cell component layer supported on a metal substrate. In these cells, the ceramic layers can be very thin since they only perform an electro-chemical function: that is to say, the ceramic layers are not self-supporting but rather are thin coatings/films laid down on and supported by the metal substrate. Such metal supported SOFC stacks are more robust, lower cost, have better thermal properties than ceramic-supported SOFCs and can be manufactured using conventional metal welding techniques.

Applicant's earlier patent application WO2015/136295 discloses metal-supported SOFCs in which the electro-chemically active layer (or active fuel cell component layer) comprises respective anode, electrolyte and cathode layers respectively deposited (e.g. as thin coatings/films) on and supported by a metal support plate 12 (e.g. foil) The metal support plate has a porous region surrounded by a non-porous region with the active layers being deposited upon the porous region so that gases may pass through the pores from one side of the metal support plate to the opposite side to access the active layers coated thereon. As shown in FIG. 1, the fuel cell unit 9 comprises three plates or layers—the metal support plate 12, a separator plate 50 and a spacer plate 13 sandwiched between them. It also has fluid ports 20, 88 (for oxidant or fuel) and the three plates are stacked upon one another and welded (fused together) through the spacer plate 13 to form a single metal-supported solid oxide fuel cell unit with a fluid volume in the middle defined by the large space 14 provided in the spacer plate 13. The metal components of the fuel cell stack repeat layer are in electrical contact with one another, with electron flow between them being primarily via the fuse/weld path, thereby avoiding surface-to-surface contact resistance losses.

As discussed in WO2015/136295, the porous region comprises small apertures (holes drilled through the metal foil substrate) (not shown) extending through the metal support plate 12, in a location to overlie the anode (or cathode, depending on the polarity orientation of the electrochemically active layer), which is positioned under the metal support plate 12. These are positioned in the large space or aperture 14 defined by the spacer plate 13 so as to allow the fluid volume to be in fluid communication with the electrochemically active layers on the underside of the support plate 12 through the small apertures.

In the separator plate 50, up and down corrugations 60 are provided to extend up to the cathode (or anode, depending on the polarity orientation of the electrochemically active layers) of a subsequent fuel cell unit stacked onto this fuel cell unit, and down to the metal support plate 12 of its own fuel cell unit. This thus electrically connects between adjacent fuel cells units of a stack to put the electrochemically active layers of the stack (usually one on each fuel cell unit) in series with one another.

It is known to provide a single central port in circular fuel cell units (for example, WO 2005/064725 A1 and US 2011/123890 A1), wherein the electrochemically active layers may be in the form of annular segments around the central port (for example WO 2005/064725 A1) or in the form of an annulus around the central port. Such architectures are significantly different to rectangular cell units given their highly symmetrical nature US 2013/0177829 A1 and US 2012/0295182 A1 provide a central manifold in a separator of dual plate construction. The separator has a "paddle" or "H" shape. There are a pair of elongate channels within the separator, extending in opposite directions, to supply, at a distal end of the channel and separated from the central manifold, a respective pair of self-supporting electrolyte electrode assemblies.

WO 2008/123968 A1 relates to a stack of cell units having a central port with self-supporting electrolyte electrode assemblies.

JP 2013/187005 A relates to cell units having two self-supporting electrolyte electrode assemblies arranged on a separator, the separator having a central port for cooling air. The cell units may be formed into a stack and fastened using bolts which pass through central port.

A solid oxide electrolyser cell (SOEC) may have the same structure as an SOFC but is essentially that SOFC operating in reverse, or in a regenerative mode, to achieve the electrolysis of water and/or carbon dioxide by using the solid oxide electrolyte to produce hydrogen gas and/or carbon monoxide and oxygen.

The present invention is directed at a stack of repeating solid oxide fuel cell units having a structure suitable for use as an SOEC or an SOFC. For convenience, SOEC or SOFC stack cell units will both hereinafter be referred to as "cell units" (i.e. meaning SOEC or SOFC stack cell units).

The present invention seeks to improve the efficiency of the fuel cell unit while providing a cell unit that is cost-efficient—reducing their cost of manufacture would be of significant benefit to reduce the entry cost of fuel cell energy production.

The present invention provides a stack of rectangular, planar electrochemical cell units, each cell unit comprising at least one first fluid mid-port that is disposed midway along its length within or between one or more active cell chemistry regions and is in fluid communication with a first fluid volume of the cell unit, wherein the first fluid mid-ports of the respective cell units align to form at least one first fluid mid-passageway extending in the stack direction; and, wherein the stack is configured such that, in each first fluid volume, first fluid flow paths extend across the one or more active cell chemistry regions between the at least one first fluid mid-port and each respective opposed cell end.

In this way, the first fluid flow paths may extend in opposed (e.g. lengthwise) directions across the one or more active cell chemistry regions between the at least one first fluid mid-port and each respective opposed cell end. Such a flow path arrangement means that one or more active cell chemistry regions may be disposed between the mid-port and each opposed cell end. Active cell chemistry disposed to each side of the mid-port means that there is a lower pressure drop across the region and shorter distance for fluid to travel to service the active cell chemistry region(s) than if the flow path extended lengthwise from one cell end to the opposed cell end across the entire cell chemistry. Thus, differences in temperature and fuel delivery/consumption may be reduced across the chemistry.

The flow path is between the mid-port and the respective opposed ends, however, the fluid flow itself will fan out across the active cell chemistry regions between the mid-port and the opposed cell ends. Nonetheless, while the flow fans out there is a (main) component of the fluid flow path extending (e.g. lengthwise) between the mid-port and the respective cell ends.

The active cell chemistry regions may share the same mid-port and may be the same distance therefrom. This increases power density of each cell unit by effectively reducing the number of ports required per unit area of active cell chemistry. This can lead to a more thermally ideal cell unit having an increased proportion of the cell unit area covered by active cell chemistry, shorter fluid flow path length, and smaller number of ports. The shorter fluid flow path length means that the temperature gradient along the path length may be reduced. The mid port(s) may extend in the stacking direction through the height of the stack.

The stack is configured such that, in use, first fluid flow paths extend in opposite directions between the at least one first fluid mid-port and each respective opposed cell end. The flow path may be symmetrical with respect to the centre of the rectangular cell unit. Indeed, the port does not need to direct the fluid flow path and fluid flow from the port may be non-directional (there may not be defined tortuous flow paths in the cell unit). In other words, the flow path around (i.e. from or to) the mid-ports is substantially radial. That is, the flow path is not constrained to a channel around (i.e. from or to) the mid-port. The one or more active cell chemistry regions may substantially surround the mid-ports.

The mid-port may be disposed midway along both the cell unit's length and width. Rectangular cell units include square cell units in which the length and width of the cell unit are equal. The cell unit may be elongate, in which case the cell unit has a length greater than a width or vice versa. The rectangular cell unit may have rounded or radiused corners disposed between two pairs of parallel edges.

A rectangular cell unit may have two pairs of substantially parallel sides. In cases where a length of a first pair of sides is greater than a length of a second pair of sides, the fluid mid-ports may be disposed midway along the length of the first pair of sides.

The cell unit may comprise a metal support plate and a separator plate, between which the first fluid volume is defined and contained. In the stack, a second fluid volume may be defined between adjacent cell units. The cell unit may comprise a metal-supported solid oxide fuel cell unit.

Each cell unit may comprise a separator plate and a metal support plate carrying, on a first side thereof, the active cell chemistry region(s) provided over a porous region, the separator plate and the metal support plate overlying one another to form the cell unit. At least one fluid port may be provided in each of the separator plate and the metal support plate, these being aligned to form respective first fluid mid-ports and first fluid passageway.

Usually, there are at least two separate active cell chemistry regions in each cell unit, each region respectively disposed between the mid-port and each opposed cell end.

The separate active cell chemistry regions may be disposed to each side of the mid-port. Smaller, separate, active cell chemistry regions generally have lower stress than a single region of equivalent area, thus the likelihood of stress-related failure is reduced.

Alternatively, there may be a continuous active cell chemistry region in each cell unit with the mid-port(s) disposed within—or surrounded by—the active cell chemistry region. The continuous active cell chemistry region may be a single region in each cell unit.

Usually, a dimension of the active cell chemistry region which is parallel to the fluid flow path and between the mid-port and one of the opposed ends of the cell unit is less than or equal to a dimension of the active cell chemistry region that is perpendicular to that fluid flow path.

The dimension of the active cell chemistry regions which is parallel to the fluid flow path and between the mid-port and one of the opposed ends of the cell unit may be taken to be the shortest distance from an edge of the active cell chemistry region that is proximal to the mid-port to an opposed edge of the active cell chemistry region that is proximal to the end of the cell unit.

The length of the cell unit may be referred to as being the dimension of the cell unit which is generally parallel to the fluid flow path and the width of the cell unit may be referred to as being the dimension generally perpendicular to the fluid flow path. Usually, the length of the flow path across the active cell chemistry regions (between a mid-port and a respective end of a cell unit) is around half the length of the cell unit, more particularly it is not less than 45% of the length of the cell unit. When discussing the width of cell chemistry (that is, the dimension of cell chemistry which is generally perpendicular to the flow path), it may be assumed that usually the width is greater than or equal to 90% of the width of the cell unit (the width of the cell unit being the dimension of the cell unit which is generally perpendicular to the flow path). Thus, the proportion of the cell unit area which is covered by active cell chemistry regions may be maximised. It is desirable to dispose the active cell chemistry regions as close to the port(s) and cell periphery as possible, since when manufacturing the cell unit and stack, even small increments in effective cell coverage can have a significant effect on power density. Thus, an aim is to minimise the proportion of the cell area which is not coated with active cell chemistry regions.

In some embodiments the distance between the at least one first fluid mid passageway and each cell end is less that the width of the cell unit (the width is generally perpendicular to the fluid flow path, which is a line between a mid-passageway and a cell end), but this is not necessarily the case.

In some embodiments, the cell unit's length is less than or equal to around 2.4 times the cell units width; there may be embodiments where the length is actually less than the width). Preferably, the cell unit's length is between 1.5 and 2.4 times the cell unit's width. Preferably still, the cell unit's length is less than or equal to twice the cell unit's width.

In a preferred embodiment, the fluid flow paths are across a dimension of the active cell chemistry layers which is the shorter of the dimensions of length and width of the active cell chemistry layers. Thus, the cell unit may have a low aspect ratio. The aspect ratio may be defined as the dimension of the active cell chemistry region which is parallel to the fluid flow path divided by the dimension of the active cell chemistry regions that is perpendicular to the fluid flow path. Low aspect ratio means that the ratio between width (distance across active cell chemistry region between inlet and outlet ports) and length of active cell chemistry layers is less than 1.2, preferably between 0.3 and 1.2. Preferably, the aspect ratio is less than 1. More preferably, the aspect ratio is less than 0.8, preferably still the aspect ratio is between 0.3 and 0.8. Very low aspect ratios (for example, those less than 0.3) are advantages for cell performance but manufacturing constraints limit these.

The fluid flow path across the shorter dimension may a) improve thermal distribution because the conduction path length from the hot inlet to the cooler outlet is reduced (as a result of the fluid entering or leaving the fluid volume midway along the cell unit's length) and may b) reduce the pressure drop between the middle fluid passageway and the cell end or an end fluid passageway, leading to increased net efficiency of a stack since parasitic loss from fluid blowers and/or pumps is reduced. The improved thermal distribution, i.e. a lower thermal density gradient may also lead to a reduced current density gradient.

Each cell unit may have only one first fluid mid-port which is in fluid communication with the first fluid volume.

Each cell unit may have only one first fluid mid-port, in which case the first fluid flow path divides and extends in the two opposed directions between the at least one first fluid mid-port and each respective cell end. Having only one first fluid mid-port allows a greater proportion of the cell unit to be used for active cell chemistry layers, thus allowing a greater power density. Alternatively, there may be multiple first fluid mid-ports, for example, arranged along a line midway between the ends of the cell unit (i.e. either side of midway along the cell unit's length and/or between the active cell chemistry regions).

Alternatively, there may be multiple first fluid mid-ports, for example, arranged on either side of the respective short axis (i.e. either side of midway along the cell unit's length), so that all flow from one mid-port tends to be directed only towards one respective cell end.

Usually, at least one first fluid end passageway is respectively provided extending in the stack direction at or near each opposed stack end. Thus, the stack may be configured so that the mid and end first fluid passageways respectively form inlet and outlet passageways, or vice versa, within the stack for supply in use of a first fluid to the first fluid volume of each cell unit, such that the first fluid flow paths extend across the one or more active cell chemistry regions of each cell between its mid-port and both opposed cell ends.

One or both first fluid end passageways may be externally manifolded around the stack ends. However, usually, the first fluid end passageways are internally manifolded by providing aligned first fluid end ports within the cell units, extending in the stack (axis) direction through the stack, with for example, appropriate sealing/gaskets between adjacent cells.

The first fluid volume may be an air or fuel fluid volume. Each cell may comprise at least one active cell chemistry region comprising an electrolyte interposed between an air electrode and a fuel electrode, with each cell comprising an air/oxidant fluid volume and a fuel fluid volume in communication with each of the air electrode and the fuel electrode, respectively. The middle and end fluid passageways thus may respectively form inlet and outlet passageways for supply of a fluid to the same respective fluid volume of each cell, which may be an air fluid volume or a fuel fluid volume.

In one embodiment, each cell unit comprises at least first and second first fluid end ports respectively disposed at or near each opposed cell end, the respective first fluid end ports being aligned to define respective first and second internal, first fluid end passageways extending in the stack direction, whereby the mid and end first fluid passageways respectively form inlet and outlet passageways, or vice versa, within the stack for supply of a first fluid to the first fluid volume of each cell unit.

The end ports provide an internal manifold for the first fluid. This aids in enclosing the first fluid volume, and means that is it straightforward to seal the first fluid volume from the second fluid volume. The active cell chemistry regions and the mid-port(s) are disposed between the respective fluid end ports. The fluid flow paths between each end port and the mid-port(s) therefore pass over the active cell chemistry regions and deliver and remove fluid therefrom (i.e., in SOFC operation, deliver fuel and remove exhaust from the fuel volume, or deliver oxidant and remove exhaust from the oxidant volume).

In one embodiment cell unit, the first fluid volume is defined by two planar components of the cell unit and a weld line between the two planar components and around their periphery seals the first fluid volume, wherein the first fluid mid-port is in fluid communication with the first fluid volume. There is no weld path around any port which is in fluid communication with the first fluid volume. One or both of the planar components may comprise flanged perimeter features, and the cell unit is sealed around the flanged perimeter features by a weld between the two planar components to form the first fluid volume. The two planar components abut (i.e. are in contact with) one another around the flanged perimeter feature. The flanged perimeter feature in a first of the planar components extends toward the other planar component (and vice-versa if both components are provided with a flanged perimeter feature).

Alternatively, where a spaced cell unit is used, a weld line around the perimeter of the cell unit may pass through a gasket or spacer disposed between the two planar components.

In one embodiment cell unit, the first fluid volume is defined by two planar components (plates) of the cell unit and a weld line between the two planar components surrounds a second fluid mid-port (that is in fluid communication with a second fluid volume) such that the second fluid mid-port is not in fluid communication with the first fluid volume. A weld line which surrounds a port and is between the two planar components (for example a metal support plate and a separator plate) seals the port from fluid communication with the (first) fluid volume between, or defined by, the two planar components. One or both of the planar components may comprise an annular feature which surrounds the second fluid mid-port and extends towards the other planar component and wherein the weld line is around the annular feature. The two planar components abut (i.e. are in contact with) one another around the annular feature. The annular feature in a first of the planar components extends toward the other planar component (and vice-versa if both planar components are provided with annular features), thus the annular feature extends inwardly within the cell unit.

Alternatively, a weld line which surrounds the port may pass through a gasket or spacer disposed between the two planar components.

In one embodiment, each cell unit further comprises at least one second fluid mid-port that is disposed midway along its length within or between one or more active cell chemistry regions and is in fluid communication with a second fluid volume of the cell unit, wherein the second fluid mid-ports of the respective cell units align to form at least one second fluid mid-passageway extending in the stack direction; and, wherein the stack is configured such that, in each second fluid volume, respective second fluid flow paths extend across the one or more active cell chemistry regions between the at least one second fluid mid-port and each respective opposed cell end.

The respective second fluid flow paths may extend in opposed directions across the one or more active cell chemistry regions between the at least one second fluid mid-port and each respective opposed cell end. As a result of the second fluid mid-port, the second fluid volume benefits from similar advantages to those discussed above for the first volume. The second fluid mid-port may be disposed midway along the cell unit's length and midway along the cell unit's width. One or more of the first and second fluid mid-ports may be offset from midway along the cell unit's width or length, and may be such that the mid-ports are symmetrically disposed about a line midway along the cell unit's width or length. The second fluid mid-port(s) are typically spaced from the first fluid mid-port in a direction substantially parallel to the cell unit's width.

In such a cell unit (having at least one second fluid mid-port), the first fluid volume may be defined by two planar components and a weld line between the two planar components and around their periphery seals the first fluid volume; and a weld line between the two planar components surrounds the second fluid mid-port. Thus, the first fluid mid-port is in fluid communication with the first fluid volume, and the weld line which surrounds the second fluid mid-port seals the second fluid volume from the first fluid volume.

One or both of the planar components may comprise an annular feature which surrounds the second fluid mid-port and extends towards the other planar component and wherein the weld line is around the annular feature. One or both of the planar components may comprise flanged perimeter features, and the cell unit is sealed around the flanged perimeter features by a weld between the two planar components to form a first fluid volume. In this case, the two planar components abut (i.e. are in contact with) one another around the annular feature and abut one another around the flanged perimeter feature. The annular feature and the flanged perimeter feature in a first of the planar components extends toward the other planar component (and vice-versa if both planar components are provided with annular and flanged perimeter features), thus the annular feature extends inwardly within the cell unit.

Alternatively, a weld line which surrounds the second fluid mid-port may pass through a gasket or spacer disposed between the two planar components.

The cell unit may comprise the two planar components which define the first fluid volume therebetween, whilst the second fluid volume is defined between adjacent cell units. Each cell unit (in one or both of the planar components) may be provided with annular features which respectively surround each first fluid port (first fluid mid-ports and, if present, first fluid end ports), wherein the annular features extend toward an adjacent cell unit and, in a stack, contact adjacent cell units. The first fluid volume may be sealed from the second fluid volume by weld lines between adjacent cell units around the annular features. The second fluid ports (e.g. second fluid mid-ports) are fluid communication with the second fluid volume, each second fluid port may be provided with raised port features which surround the fluid port and allow fluid communication between the second fluid volume and the passageway defined by the second fluid port. These raised port features are provided in one or both of the planar components and protrude away from the other planar component of the cell unit, thus they protrude toward an adjacent cell unit.

Usually, the first fluid mid-port is an inlet port. Preferably, the second fluid mid-port, where present, is an inlet port. The first and/or second fluid mid-passageway may comprise an inlet or outlet passageway. When used as an inlet passageway (such that the mid-port is a delivery or inlet port) to the first and/or second (respectively) fluid volume, the use of a mid-port as an inlet port aids stack warm-up, both in terms of speed of warm up and reduces temperature variation across the cell as the hot fluid enters each cell unit near the centre of the stack thereby reducing the path length for heat conduction from the inlet to the outlet for a given cell length.

Preferably each cell unit comprises two first fluid mid-ports each in fluid communication with the first fluid volume and one second fluid mid-port in fluid communication with the second fluid volume, and optionally wherein the second fluid mid-port is disposed between the two first fluid mid-ports.

Preferably, flow in both fluid volumes is symmetrical, leading to improved thermal and fluid distribution. The fluid mid-ports may be aligned along a line midway along the length of the cell unit, the line may be within or between one or more active cell chemistry region. The line may be substantially perpendicular to the length of the cell unit. The two first fluid mid-ports (in fluid communication with the first fluid volume) may be evenly spaced (preferably in the width direction) from the one second fluid mid-port (in fluid communication with the second fluid volume).

Alternatively, there may be two second fluid mid-ports with one first fluid mid-port disposed therebetween. Again, this leads to symmetrical fluid flow paths.

Alternatively, and for example, there may be a plurality of mid-ports in proportion to the width (the dimension perpendicular to the general fluid flow path) of the cell unit, the plurality of mid-ports arranged symmetrically with respect to midway across the cell unit's width. If both first fluid mid-ports and second fluid mid-ports are present, there may be a plurality of each and which alternate symmetrically with respect to midway across the cell unit's width, such that a first fluid mid-port is adjacent to two second fluid mid-ports and vice versa. The plurality of mid-ports being arranged along a line midway between the ends of the cell unit (i.e. either side of midway along the cell unit's length and/or between the active cell chemistry regions).

Where there is at least one second fluid mid-port, first fluid end passageways in fluid communication with the first fluid volume may be provided that extend in the stack direction at or near each opposed stack end, these being internally manifolded passageways respectively defined by aligned first and second first fluid end ports within each cell unit, whilst second fluid end passageways in fluid communication with the second fluid volume are provided that extend in the stack direction at or near each opposed stack end, these being externally manifolded passageways beyond each cell unit.

For each of the first fluid volume and the second fluid volume, the stack may be configured so that mid and end fluid passageways respectively form inlet and outlet passageways, or vice versa, within the stack for supply in use of the particular fluid to the fluid volume of each cell unit, such that the fluid flow paths extend across the one or more active cell chemistry regions of each cell between its mid-port and both opposed cell ends. The end passageways for one or both fluid types may be internally manifolded, but for maximum active cell chemistry surface area one type of fluid end passageway is preferably externally manifolded.

Preferably, the aligned first and second first fluid end ports and the two first fluid mid-ports form a diamond-shaped arrangement. The first fluid mid-ports may be disposed midway on cell unit's length and symmetrically toward edges of cell unit's width, and the first fluid end ports are disposed midway across the cell unit's width. Preferably, the diamond-shaped arrangement of ports is for the fuel ports, preferably the mid-ports are inlet ports to the first fluid volume and the end ports are outlet or exhaust ports from the first fluid volume. In this case, the second fluid mid-port is for oxidant, and preferably, is an inlet port to the second fluid volume.

Usually, the first fluid volume is a fuel volume and the second fluid volume is an oxidant volume. Pressure drops across the active cell chemistry length are typically more pronounced for oxidant, and so it is preferable that the second, externally manifolded, fluid is oxidant because the gap between adjacent cell units is generally larger than a gap between metal substrate and separator plate in a cell unit, which defines the second fluid volume. This means that the first fluid volume, for fuel in this case, is contained or sealed within the cell unit and in fluid communication with the first fluid mid passageway and, where present, first fluid end passageways. Further, if the first fluid volume (which is enclosed by the cell unit) were to be adapted for air, then the gap between the metal substrate and separator plate would have to be increased, leading to greater material usage for creating the larger gap, and therefore a greater stack cost.

In an alternative arrangement of ports of the cell unit, there may be two pairs of first fluid end ports in a cross-shaped arrangement with a single first fluid mid-port. The single first fluid mid-port may be disposed midway along both the length and width axes of the cell unit, and each of the first fluid end ports may be disposed toward a corner of the (rectangular or square) cell unit. In this case, there may be two second fluid mid-ports, with the first fluid mid-port disposed therebetween. The second fluid may have end passageways, the second fluid end passageways in fluid communication with the second fluid volume are provided that extend in the stack direction at or near each opposed stack end, these being externally manifolded passageways beyond each cell unit. Preferably, in this arrangement, the first fluid is fuel and the second fluid is oxidant.

Ideally, the one or more first fluid mid-ports is or are symmetrically disposed within the cell unit about one or both axes of the cell unit. The mid-port(s) may be disposed toward the centre of either or both the length and width axes of the cell unit. Symmetrical positioning of the mid-port encourages symmetrical flow to or from the mid-port, and thus to symmetrical fluid distribution and even temperature profile across cell unit. Even temperature distribution across the cell unit, and more particularly across the active cell chemistry region(s) assists even degradation of the active cell chemistry through its lifetime.

When present, the one or more second fluid mid-port(s), preferably is or are symmetrically disposed within the cell unit about one or two axes of the cell unit.

In an arrangement there may be too first fluid mid-ports and two second fluid mid-ports. The two first fluid mid ports and two second fluid mid ports may each be disposed either side of a line midway along the cell unit's length and one of each of the first fluid mid port and the second fluid mid-port disposed toward each edge of the cell unit's width. Thus, there may be pairs of mid-ports each pair of mid-ports having a first fluid mid-port and a second fluid mid-port, each pair toward each edge of cell unit's width. The centre of each pair is midway on cell unit's length, preferably in the first pair the first fluid mid-port is toward a first end of the cell unit's length and the second fluid mid-port is toward a second end of the cell unit's length (the first end opposite the second) and in the second pair the first fluid mid-port is toward the second end of the cell unit's length and the second fluid mid-port is toward the first end of the cell unit's length.

Preferably, the one or more active cell chemistry regions are wrapped around at least one of any mid-ports or end ports provided in the cell units.

The fluid ports around which the active cell chemistry regions are wrapped may include one or more of: the at least one first fluid mid-port, the at least one second fluid mid-port and any cell end ports present. By wrapped it is meant that the active cell chemistry region at least partially encircles a port (e.g. around more than 90 degrees, 180 degrees, or around 360 degrees of the port). The shape of the edge of the active area may match or reflect the shape of the edge of the port, such that the active area at least partially surrounds the port. If the ports are circular, the edge of the wrapped active cell chemistry region takes the form of an arc. The edge of the active area may be equidistant from the port around the wrapped region. Alternatively or additionally, the wrapped edge of the active area may not be equidistant from the port, in particular the radius defining the edge of the active area may increase with distance from the port around which the active area is wrapped.

This wrapping of the active cell chemistry regions maximises the area within the cell unit that is available for the active cell chemistry regions, thus maximising power density in the stack. In other words, when viewing the cell unit along its length from one cell end to the other opposed cell end, a particular position along that length that is simultaneously occupied by a port and cell chemistry (because the chemistry extends around the mid-port or end port in question), respectively, will achieve higher utilisation than cells with chemistry confined only to regions beyond regions where ports are located.

The active area may be wholly wrapped around a mid-port if the active cell chemistry region is a single region. The active cell chemistry region may be spaced from the port to allow space for a gasket and/or shaped port features. A barrier layer (for example an extended electrolyte layer) may extend underneath a gasket and a gasket may contact the barrier (e.g. electrolyte) layer, enabling tight wrapping of the active cell chemistry around the port.

Alternatively or additionally to wrapping, one or more of the ports may be elongated in the width direction of the cell unit. For example, one or more of the ports may be rectangular which may enable rectangular wrapping around the rectangular ports. In this case, it may be preferable that the mid-ports are rectangular as this may allow increased proportion of the cell unit area to be provided with active cell chemistry regions without necessarily wrapping the active cell chemistry regions. Similar is true for end ports.

In one cell unit, one of the first or second fluid volumes is defined by a planar component having an elongate, shaped feature that extends at least partially around the periphery of the active cell chemistry region to confine a fluid flow path within that region.

Preferably, the planar component is a metallic component. The planar component may be an interconnecting plate, current collector plate, separator plate, cell chemistry supporting substrate or the like. The elongate feature acts to direct and retain fluid in one or both of the fluid volume(s). That is, the elongate feature greatly reduces air bypass around the sides of the cell unit (air bypass around the side of the cell unit cannot participate in chemical reaction at the active cell chemistry regions).

The elongate shaped feature may comprise feature in the planar component that forms a protruding rib on one side of the component and a channel on the other side of the component. Such a protruding rib on one side of the component may confine a flow path of the first fluid or a second fluid within the active cell chemistry region, and on its other side extend as a channel to encourage a flowpath along the periphery of that region, thereby delivering fluid toward a distal edge of the region. An elongate shaped feature that comprises a feature in the planar component that forms a protruding rib on one side of the component and a channel on the other side of the component may be a pressed or formed feature.

The rib protrudes into one fluid volume, and acts to contain that fluid, one of fuel or oxidant, (which would otherwise pass around the sides of the cell unit) in the fluid volume. The rib may form a depression in a second fluid volume which forms a supply channel to supply a second fluid, the other of fuel and oxidant.

The rib may be a formed or pressed feature, in which case the rib forms a depression in a second fluid volume which forms a supply channel to supply a second fluid, the other of fuel and oxidant. The rib may be a formed or pressed feature on an interconnect plate or separator plate and protrudes toward an adjacent cell unit in the stack.

Usually, the rib or elongate feature contacts an electrolyte or cathode layer of the active cell chemistry region or electrolyte beyond the region of the adjacent cell. Thus, a fluid volume is formed between the interconnect plate or separator plate and the active cell chemistry region of the adjacent cell unit. The protruding side of the rib or elongate feature acts to contain the fluid in the fluid volume formed between the interconnect plate or separator plate and the active cell chemistry region of the adjacent cell unit, preventing fluid from exiting the cell to the sides of the cell unit.

Preferably, the rib or elongate feature protrudes into a fluid volume that has externally manifolded passageways beyond the end of each cell unit, in which case the rib acts to confine and direct that fluid between the respective ends of the cell unit and the fluid mid-port. Preferably still, the rib or elongate feature protrudes into the oxidant volume, and the opposite side of the rib or elongate feature forms a supply channel for fuel in the opposite fluid volume.

The rib or elongate feature may comprise a pair of such ribs or elongate features aligned, in the stack, with an edge of the porous region or active cell chemistry region. Each rib or elongate feature is respectively disposed to an edge of the porous region or active cell chemistry region and, as a result, substantially aligned with the edge of the cell unit.

Each rib or elongate feature may be continuous along the cell unit length. Alternatively, each rib or elongate feature may be discontinuous, with the discontinuity being by a fluid mid-port. The discontinuous ends of the rib or elongate feature may be proximal to a gasket or formed port feature, the gasket or formed port feature forming part of a middle fluid passageway, such that the rib or elongate feature and gasket or formed port feature co-operate to contain the fluid in the fluid volume.

The discontinuous rib or elongate feature may also curve toward the centre of the cell unit at the end of the rib or elongate feature which is proximal to a mid-port. For example, the rib or elongate feature may curve to match a curve in the edge of the active cell chemistry region, for example to match the curve or the active cell chemistry wrapped around a port. In this case, the rib or elongate feature is sized such that on the side which it is a channel, it delivers fluid (eg fuel) to the corners of the active cell chemistry regions at the ends of the cell unit. This is particularly preferable where the cell unit comprises two first fluid mid-ports (disposed toward opposed edges of the cell unit) with at least a second fluid mid-port disposed therebetween, the mid-ports aligned midway along the cell unit's length, and there is first and second first fluid end ports respectively disposed at or near each opposed cell end (i.e. similar to or the same as the "diamond" configuration described herein). In such a cell unit, the discontinuous ribs may curve toward the second fluid mid-port in the region of their end which is proximal to the first fluid mid-ports, and the end of the ribs is proximal to a gasket in the second fluid volume. In this case the rib may form a protrusion in the second fluid volume and a depression in the first fluid volume. As a result, the curved rib prevents bypass of second fluid out of the second fluid volume while providing a fluid delivery channel for first fluid to improve supply to areas of the cell chemistry regions near the corners of the cell unit, thus preventing fuel starvation in said areas. This has been shown to provide much more of an increase in uniformity in fuel supply to outlying regions than expected.

Where there are multiple mid-ports for one of the fluid volumes, partitioning by dividing ribs or 3D shaped formations (as soft barriers) or welds (as hard or absolute barriers) that extend from a particular mid-port for example across a cell can be used to ensure that fluid is only directed to a certain part of the active cell chemistry region. Where there are multiple chemistry regions, such dividing means can be used to ensure that an active cell chemistry region has a dedicated mid port supply passageway supplying fluid only to a particular chemistry region (e.g. a region on one half of the cell), whereas the other mid-port provides a dedicated supply passageway supplying fluid only to a remaining active cell chemistry region. Whilst this can have benefits it is not without risk in that failure of fluid supply within a dedicated fluid passageway could lead to fuel starvation of only the associated divided region leading to failure of part of the cell/stack.

In one embodiment, the cell unit comprises:
a separator plate; and
a metal support plate carrying, on a first side thereof, the active cell chemistry region(s) provided over a porous region;
the separator plate and the metal support plate overlying one another to form the cell unit;
wherein:
at least one of the separator plate and the metal support plate comprises flanged perimeter features formed by pressing the plate to a concave configuration;

the separator plate and the metal support plate are directly adjoined at the flanged perimeter features to form the first fluid volume therebetween, optionally by welding;

at least one fluid port is provided in each of the separator plate and the metal support plate, these being aligned to form the first fluid passageway within the flanged perimeter features, each port being either the first fluid mid-port and/or a first fluid end port and in communication with the first fluid volume; and, at least one of the separator plate and the metal support plate is provided with shaped port features formed around the at least one fluid port by pressing, which shaped port features extend towards the other plate, and elements of the shaped port features are spaced from one another to define fluid pathways between the elements from the port to enable passage of fluid from the at least one first fluid port to the first fluid volume.

Instead of a metal support plate, a spacer and a separator plate, the cell unit may only comprise two layers/components i.e. the metal support plate and the separator plate, while still ultimately operating in substantially the same way, with substantially the same output per square centimeter of electrochemically active layer per cell unit. This simplifies the number of components needing to be supplied and treated (e.g. coated) and simplifies the assembly, as well as providing an immediate reduction in the amount of material needed, and thus a reduction in both the material cost and weight of each fuel cell unit.

The concave configuration can give the relevant plate the appearance of a rimmed tray, with a correspondingly convex outside shape (outside relative to the fuel cell unit) and usually a planar base, the concavity thus defining (e.g. part of) the fluid volume in the assembled cell unit. In this concave configuration, the flanged perimeter features extend out of a plane of the original sheet of the separator plate, and/or of the metal support plate, toward a respective opposed surface of the other of the separator plate and the metal support plate. The fluid volume is thus bordered by formed flanged perimeter features, which are formed by pressing, such as by use of a die press, hydroforming or stamping. These are simple processes that are already being undertaken in the formation of central projections in the fluid volume, as found likewise on the separator plate in the prior art, for supporting and electrically connecting adjacent fuel cells via the electrochemically active layers. Such central in and out projections may thus also be pressed from the original sheet for the separator plate, either before or after the flanged perimeter features and the shaped features, but more preferably at the same time.

In some embodiments the porous region is formed by holes drilled into the metal support plate—usually laser drilled.

In some embodiments the (active) fuel cell chemistry layers takes the form of an electrochemically active layer comprising an anode, an electrolyte and a cathode formed (e.g. coated or deposited) onto the metal support plate over the porous region that is provided within the metal support plate in such embodiments. This arrangement with the (non self-supporting, thin) chemistry layers provided directly on the metal support plate requires the minimum number of components. The metal support plate thus performs a dual function of supporting the cell chemistry and defining the fluid volume (together with the separator). Moreover, it will be appreciated that both the metal support plate and the separator have an oxidant-exposed side and a fuel-exposed side, and thus are components that are subjected to a demanding dual atmospheric environment.

In other embodiments the porous region is provided on a separate plate (e.g. metal foil) over which the fuel cell chemistry layers are formed (e.g. coated or deposited), and the separate plate (carrying the fuel cell chemistry layers) is provided over a window (e.g. a frame) on the metal support plate.

There can be multiple areas of fuel cell chemistry layers. For example there can be multiple areas of small holes in the metal support plate covered by separate, respective electrochemically active layers. Alternatively there can be multiple windows in the metal support plate and multiple separate plates onto (over) which the active cell (fuel cell) chemistry layers are formed located above those windows.

The or each separate plate may be welded onto the metal support plate over a window in the metal support plate.

In the stack, it may be that a further at least one fluid port is provided in each of the separator plate and the metal support plate, these being aligned to form, a second fluid passageway within the flanged perimeter features, each port being either a second fluid mid-port and/or a second fluid end port and in communication with a second fluid fluid volume on a second side of the metal support plate, wherein the second fluid passageway is sealed from the first fluid volume, optionally by the provision of a weld around the second fluid port, the port further optionally being provided with an annular flange formed by pressing an annular region around the port in at least one of the separator plate and the metal support plate.

In a preferred embodiment, the first and second fluid flow paths are in a co-flow arrangement across the active cell chemistry regions. The fluids may flow in a co-flow arrangement whereby both the first and second fluid flow paths are from the respective ends of the cell unit to the centre of the cell unit or vice-versa. That is, from end fluid passageways to mid passageways, or vice-versa.

Alternatively, the fluids may be in a counterflow arrangement whereby the first fluid flow path is from the respective ends of the cell unit to the centre of the cell unit and the second fluid flow path is from the centre of the cell unit to the respective ends of the cell unit, or vice-versa. That is, the first fluid flow path is from the mid passageways to the end passageways and the second fluid flow path is from the end fluid passageways to the mid passageways, or vice-versa.

Alternatively, the fluids may be in a co-counter-flow arrangement whereby the first fluid flow path is from the respective ends of the cell unit to the centre of the cell unit (or vice-versa) and the second fluid flow path is from one end of the cell unit to the opposite end of the cell unit. That is, the first fluid flow path is from the mid passageways to the end passageways (or vice-versa) and the second fluid flow path is from an end fluid passageway at one end of the cell to an end passageway at the opposite end of the cell.

Alternatively, the fluids may be in a cross-flow arrangement whereby the first fluid flow path is from the respective ends of the cell unit to the centre of the cell unit (or vice-versa) and the second fluid flow path is substantially perpendicular to the first fluid flow path, the second fluid flow path being from one long side of the cell unit to the opposite long side of the cell unit. That is, the first fluid flow path is from the mid passageways to the end passageways (or vice-versa) and the second fluid flow path is respectively from and to an internally or externally manifolded side fluid passageway respectively disposed at or near each opposed cell long.

The co-flow arrangement is preferred because it results in the hottest part cell unit area being toward the end of the cell unit, in contrast to counter-flow where the hottest part of the cell unit is toward the centre of the active cell chemistry regions (midway between the mid-port and the end of the cell unit). Thus, for counter-flow, the measured temperature of exhaust fluid better reflects the hottest temperature of the stack, which is an important parameter because, excess heat may lead to cell unit failure. Further, in counter-flow the hottest temperature is typically hotter than in co-flow (all other parameters being equal) therefore a greater fluid flow rate for cooling (typically using oxidant flow) is required in the counter-flow arrangement, thus increasing parasitic loss from blowers or pumps over the co-flow arrangement.

In an alternative arrangement, there may be two first fluid mid-ports and two second fluid mid-ports. The two first fluid mid-ports and two second fluid mid-ports each disposed either side of midway on cell unit's length and one of each of the first fluid mid-port and the second fluid mid-port disposed toward each edge of the cell unit's width. Thus, there are pairs of mid-ports each pair of mid-ports having a first fluid mid-port and a second fluid mid-port, each pair toward each edge of cell unit's width. The centre of each pair is midway on cell unit's length: in a first pair the first fluid mid-port is disposed from midway toward a first end of the cell unit, and in the second pair the first fluid port is disposed from midway toward a second end of the cell unit, the first end opposite the second end.

In an alternative arrangement, there may be one first fluid mid-port and one second fluid mid-port. The first fluid mid-port toward first edge of cell unit's width, and the pair of first fluid end ports are respectively disposed one at each end of the cell unit's length and toward a second edge of the cell unit's width. The second fluid mid-port disposed toward second edge of cell unit's width, and a pair of second fluid end ports are respectively disposed one at each end of the cell unit's length and toward the first edge of the cell unit's width. Thus, there is a v-shaped arrangement for first fluid ports and a v-shaped arrangement for second fluid ports.

In a preferred arrangement, the first fluid is fuel and the second fluid is oxidant, and the stack comprises rectangular (including elongate and square), planar electrochemical cell units, each cell unit comprising two first fluid mid-ports that is disposed midway along its length within or between one or more active cell chemistry regions and is in fluid communication with a first fluid volume of the cell unit, and wherein the stack is configured such that, in each first fluid volume first fluid flow paths extend (in opposed directions) across the one or more active cell chemistry regions between the at least one first fluid mid-port and each respective opposed cell end. In this arrangement, the stack may further comprise one second fluid mid-port that is disposed midway along the cell unit's length within or between one or more active cell chemistry regions in fluid communication with a second fluid volume of the cell unit, wherein the second fluid mid-port is disposed between the two first fluid mid-ports, wherein the stack is configured such that, in each second fluid volume respective second fluid flow paths extend (in opposed directions) across the one or more active cell chemistry regions between the at least one second fluid mid-port and each respective opposed cell end.

In this arrangement, the stack may further comprise first fluid end passageways in fluid communication with the first fluid volume that extend in the stack direction at or near each opposed stack end and midway along the width of the cell unit, these being internally manifolded passageways respectively defined by aligned first and second first fluid end ports within each cell unit. The stack may further comprise second fluid end passageways in fluid communication with the second fluid volume that extend in the stack direction at or near each opposed stack end, these being externally manifolded passageways beyond each cell unit.

Preferably, the first fluid mid-ports of the respective cell units align to form at least one first fluid mid-passageway extending in the stack direction. Preferably, the second fluid mid-ports of the respective cell units align to form at least one second fluid mid-passageway extending in the stack direction.

A cell unit may be a rectangular (e.g. an elongate or square) fuel or electrolysis cell unit with at least one fuel mid-port and one oxidant mid-port. The mid-ports may be located midway along the cell unit's length such that they divide the active cell region into two halves, and wherein either at least a pair of fuel end ports are respectively disposed one at each end of the cell unit's length; and/or wherein at least a pair of oxidant end ports are respectively disposed one at each end of the cell unit's length; such that the cell is configured to have both a fuel flowpath and an oxidant flowpath, each flowpath extending in opposed directions from the respective mid port to the respective corresponding opposite end ports or respective cell unit ends, where externally manifolded. The cell unit may comprise two planar components, with ports provided through each of the planar components. The two planar components define or enclose a first fluid volume therebetween. The one of the mid-ports may be provided with a raised port feature in the form of an annulus, the raised port feature protrudes from one or both of the planar components toward the other planar component (i.e. within and through the first fluid volume), such that the raised port feature in one planar component abuts or contacts the other planar component. A weld line may be provided around the raised port feature which seals the port from fluid communication with the first fluid volume. Ports in fluid communication with the first fluid volume (e.g. the first fluid mid-port) may be provided with raised port features around the port extending into the first fluid volume from one or both of the planar components to contact the other of the planar components, this acts to resist stack compression forces while allowing fluid communication between the port and the fluid volume. These ports may also be provided with annular raised features in one or both of the planar components and extending away from the other of the planar components in the cell unit, these raised features adapted for contact with an adjacent cell unit in a stack to seal said ports (with a weld line around the raised feature) to prevent fluid communication between said ports and a fluid volume defined between adjacent cell units.

A cell stack may be an electrochemical cell stack comprising a plurality of planar cells stacked upon each other, wherein each cell: has a length greater than a width, comprises at least one cell mid-port disposed midway along the length of the stack, comprises at least first and second cell end ports respectively disposed at or near each opposed end of the length of the cell, comprises at least one active cell chemistry region comprising an electrolyte interposed between an air electrode and a fuel electrode; and, comprises an air fluid volume and a fuel fluid volume in communication with each of the air electrode and the fuel electrode respectively. The respective cell mid-ports may be aligned to form an internal fluid middle passageway extending in the stack direction and connected to either the respective air or the respective fuel fluid volumes of the cells. The respective first and second cell end ports may be aligned to form respective first and second internal fluid end passageways, each extending in the stack direction and connected to the same fluid volumes. The middle and end passageways may respectively form inlet and outlet passagesways, or vice versa, for that fluid volume, so as to define opposed flowpaths in that volume that extend across each cell between each cell mid-port and the respective corresponding end ports.

In an example, the cell unit comprises inherent shaped features (for example, flanged perimeter features) that create a fluid volume in the cell unit. The cell unit may comprise flanged perimeter features, and the cell unit may be sealed around the flanged perimeter features to form a first fluid volume. Sealing may be by means of a weld around the flanged perimeter feature. Weld(s) may also be used around the mid-port(s) and end port(s) to seal the first fluid volume from the second fluid volume. The cell may comprise a metal substrate and a separator plate, at least one of which has a flanged perimeter feature. This reduces the number of components, as a spacer is not required, thereby reducing material wastage. It may also conveniently electrically connect the two metal plates.

The fluid port(s) are provided as an opening through each of the cell units (i.e. through each of the metal substrate and separator plate of each cell unit), the respective fluid ports being aligned with each other in the direction of stacking to form a fluid passageway, which is in communication with a respective fluid volume.

Preferably, the cell unit (i.e. et least one of the metal substrate and the separator plate) is provided with shaped port features formed around a port that extend inwardly within the cell unit, elements of the shaped port features being laterally spaced from one another to define fluid pathways between the elements from the port to enable passage of fluid from the port to the fluid volume enclosed by the cell unit. The shaped port features are also preferably formed by pressing.

At least one of the metal substrate and the separator plate may be provided with shaped port features formed around its port that extend outwardly away from the fluid volume enclosed by the cell unit. Where multiple such cell units are stacked adjacent one another, such features may serve laterally to locate a sealing gasket provided between the cell units, or such features may interface with an adjacent plate (metal substrate and the separator plate) to form a hard stop to limit compression of a gasket provided between or within the cell units, or may form a surface upon which a seal may be formed in situ from a sealing paste or the like. Within a stack of cells, metal substrates may be electrically connected to adjacent separator plates and so such shaped port features may be welded to those of adjacent metal substrates or separator plates conveniently providing both an electrical connection and enabling sealing of the ports/manifolds.

A support structure may be provided within the fluid volume enclosed by the cell unit in order to help maintain a spacing between the metal substrate and the separator plate.

The support structure may be a permeable support structure, and need only be exposed to one fluid environment, which is the same fluid environment over its surface area. This reduces the thermal and chemical requirements of the support structures. The innermost electrodes (closest to the supporting metal substrate) may be electrically connected by virtue of the metal substrate, and the outermost electrodes may be electrically connected by means of current collecting structures. The current collecting structures may be permeable support structures, and need only be exposed to one fluid environment, which is the same fluid environment over its surface area. This reduces the thermal and chemical requirements of the current collecting structures.

Alternatively, the separator plate may comprise dimples formed or pressed therein which extend toward and or away from the active cell chemistry regions of the cell unit. The dimples help maintain a spacing between the metal substrate and the separator plate and collect current from the active cell chemistry regions.

The support structure or separator plate facing the active cell chemistry regions within the fluid volume enclosed by the cell unit may be provided with a catalyst in order to promote internal reforming, for example when the fluid volume is a fuel volume. If a support structure is not provided within the fluid volume, such a catalyst may be provided on the metal substrate surface, for example when the fluid volume is a fuel volume.

These and other features of the present invention will now be described in further detail, by way of various embodiments, and just by way of example, with reference to the accompanying drawings (which drawings are not to scale, and in which the height dimensions are generally exaggerated for clarity), in which:

FIG. 1 shows an exploded view of a prior art fuel cell unit;

FIGS. 2*a*-2*c* show a cell unit according to the invention including a spacer;

FIGS. 2*d*-2*f* show an alternative spacerless cell unit according to the invention;

FIG. 2*g* shows a further spacerless cell unit according to the invention;

FIGS. 3*a* and *b* show perspective and cross-sectional views, respectively, of a fluid port having formed port features and a flange.

FIGS. 4*a* and *b* show plan and cross-sectional views, respectively, of the cell unit of FIG. 2, with schematic fluid flow paths shown between the fluid ports. FIGS. 4*c*-*e* show variant fluid flow directions for the cell unit of FIG. 4*a*. FIG. 4*f* shows a plan view of a cell unit having a curved rib.

Figure 8A:
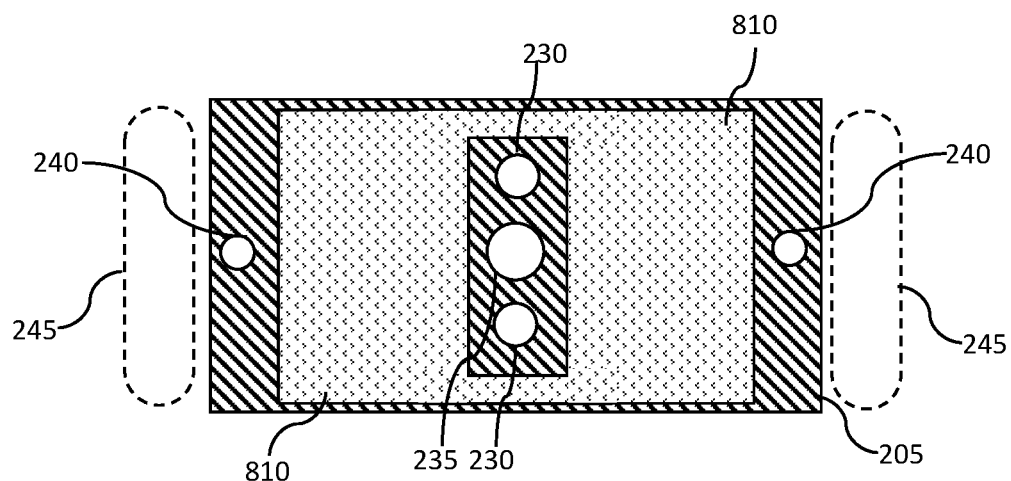
Figure 8B:
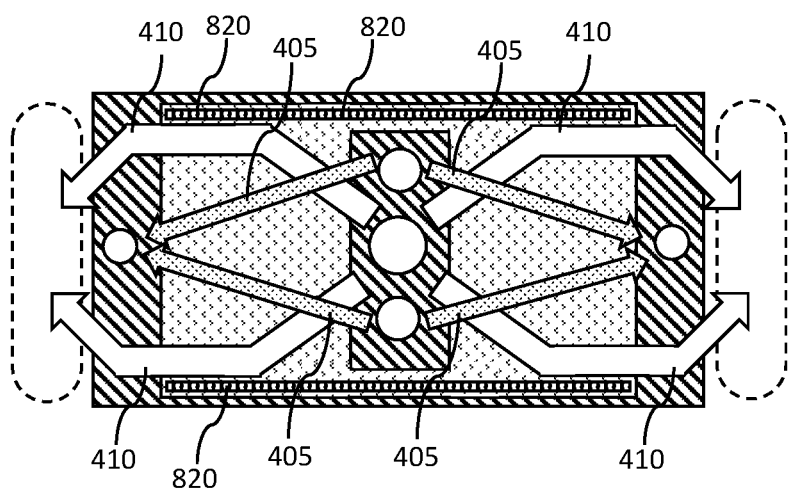

FIGS. 8*a*-*b* show a plan view of a cell unit having a single region of electrochemically active layers.

Figure 9A:
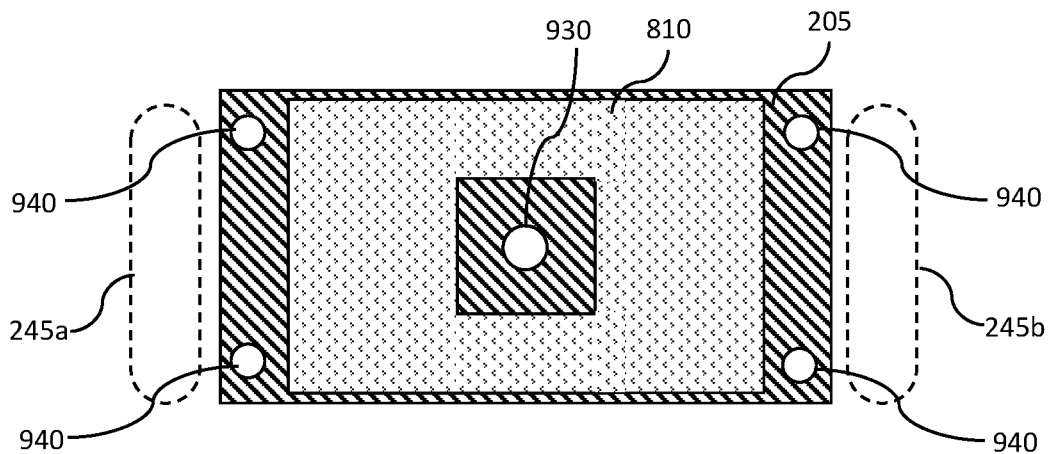
Figure 9B:
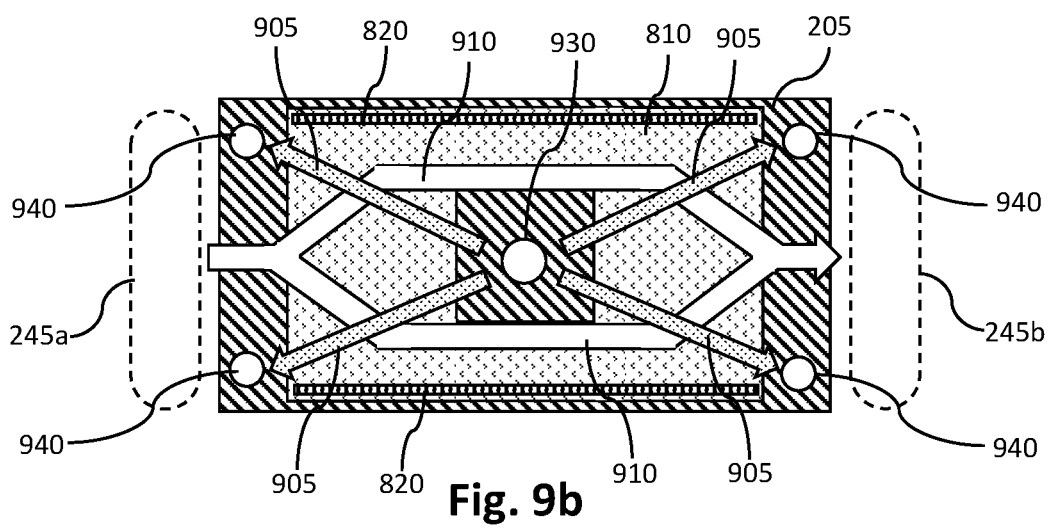
Figure 9C:
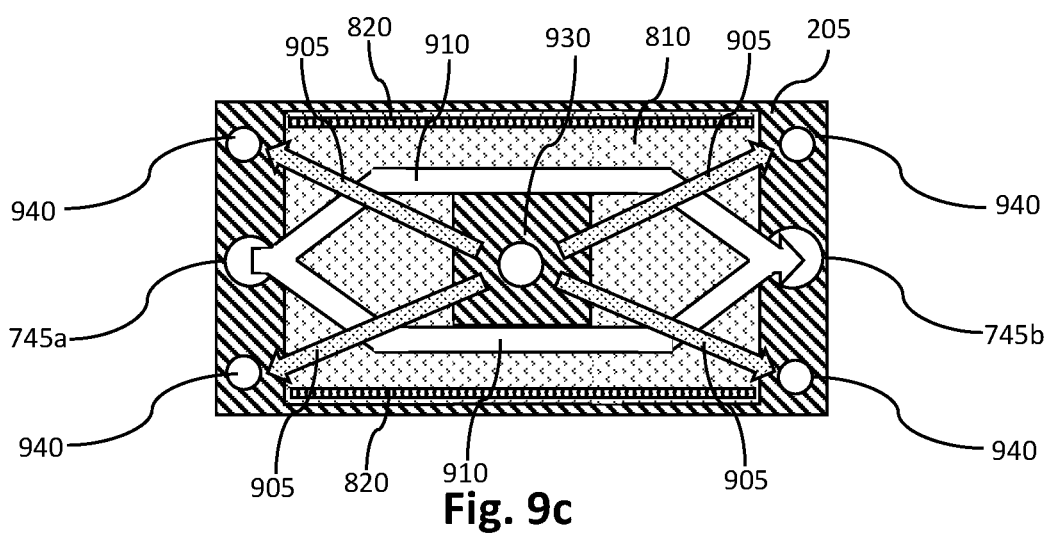

FIGS. 9*a*-*c* show a plan view of a cell unit having a single region of electrochemically active layers and a co-counter-flow arrangement for the first and second fluids.

Figure 10A:
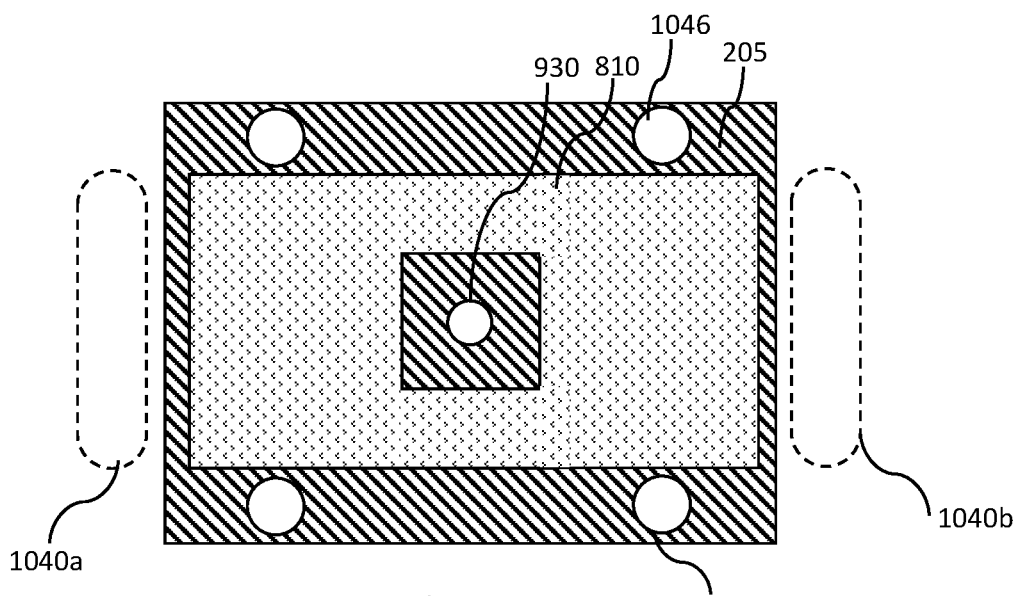
Figure 10B:
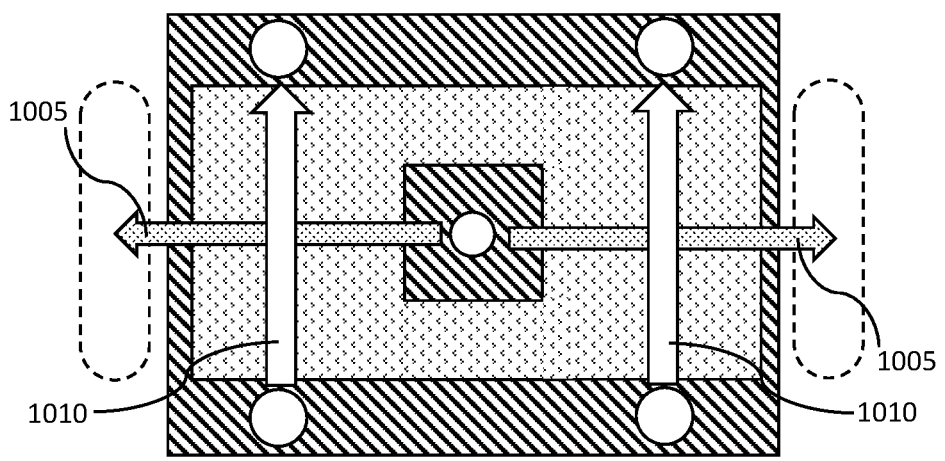

FIGS. 10*a*-*b* show a plan view of a cell unit having a single region of electrochemically active layers with the first and second fluids in a cross-flow arrangement.

Figure 11A:
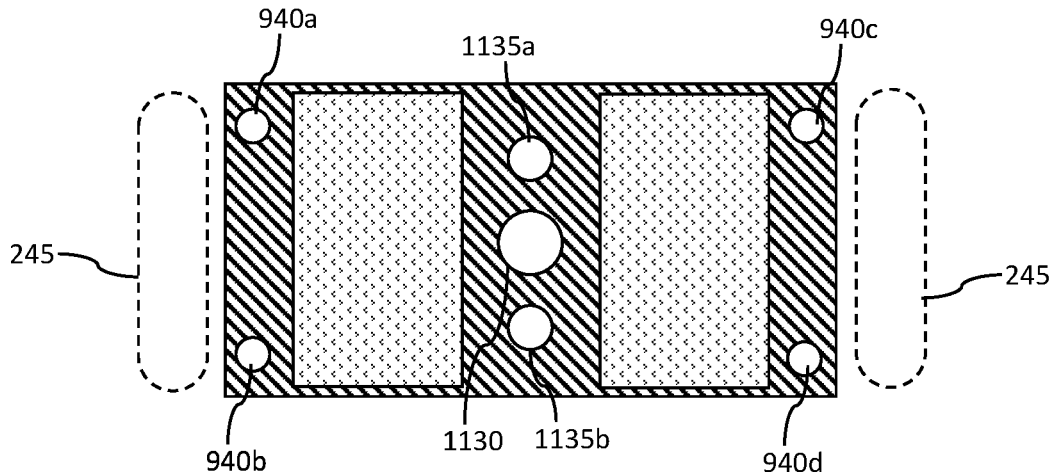
Figure 11B:
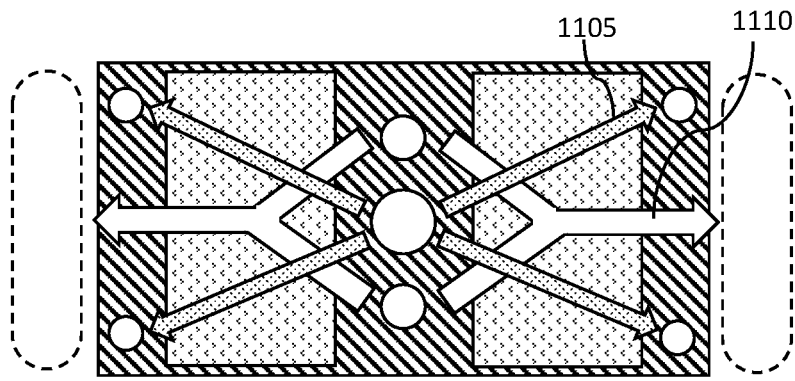
Figure 11C:
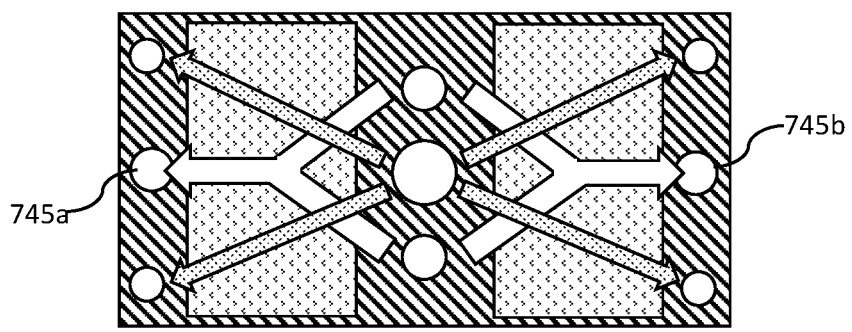

FIGS. 11*a*-*c* show a plan view of a cell unit having first fluid end ports disposed toward each corner of the cell unit.

Figure 12A:
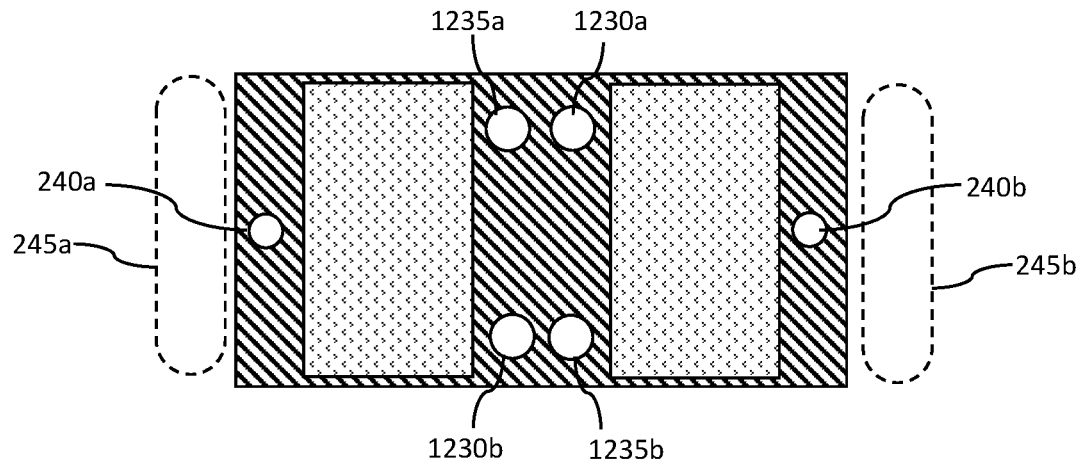
Figure 12B:
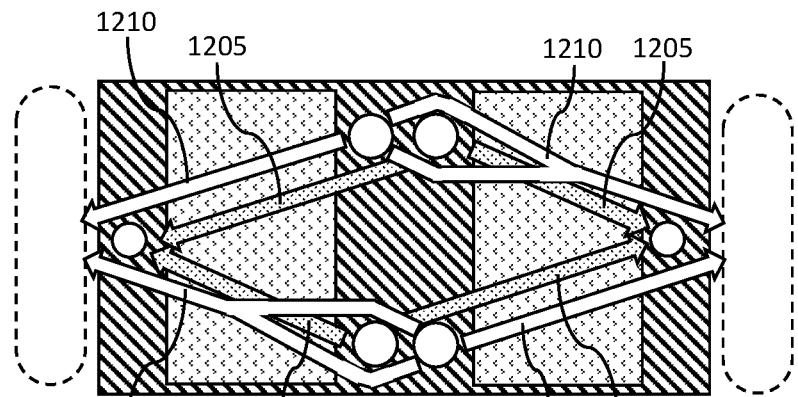
Figure 12C:
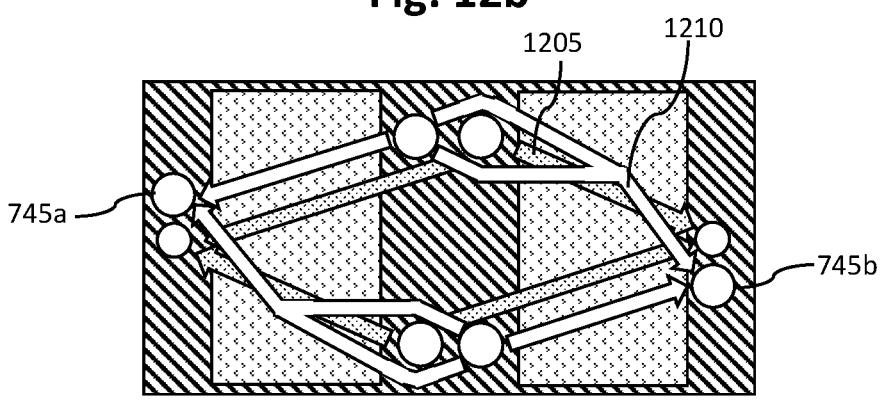

FIGS. 12*a*-*c* show a plan view of a cell unit having two first fluid mid-ports and two second fluid mid-ports.

Figure 13A:
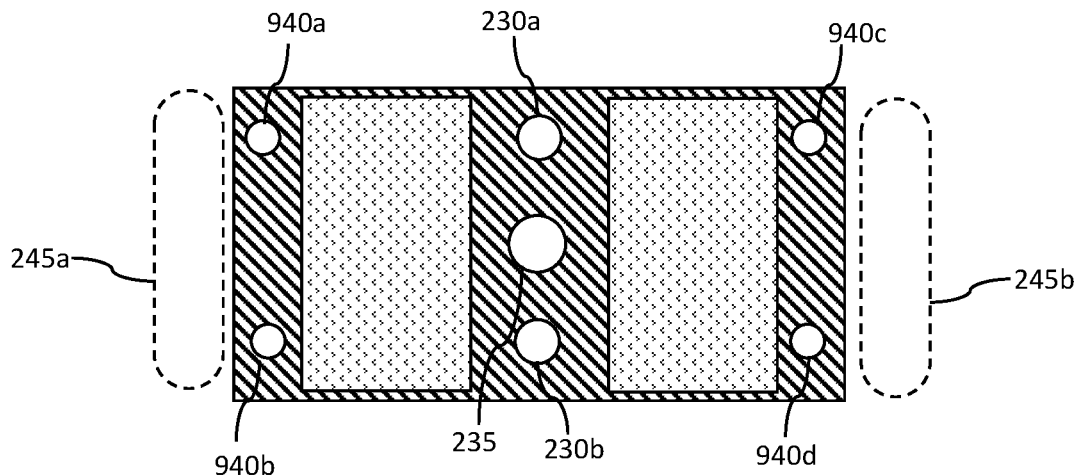
Figure 13B:
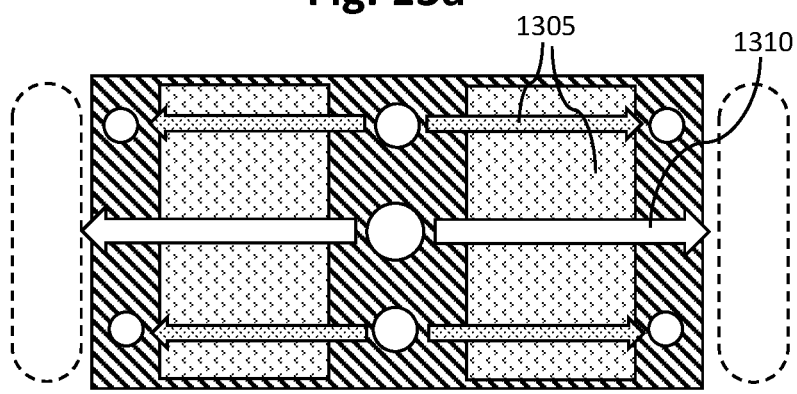
Figure 13C:
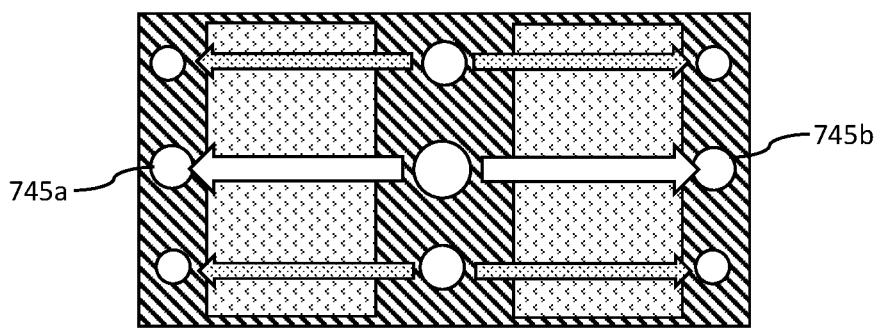
Figure 14A:
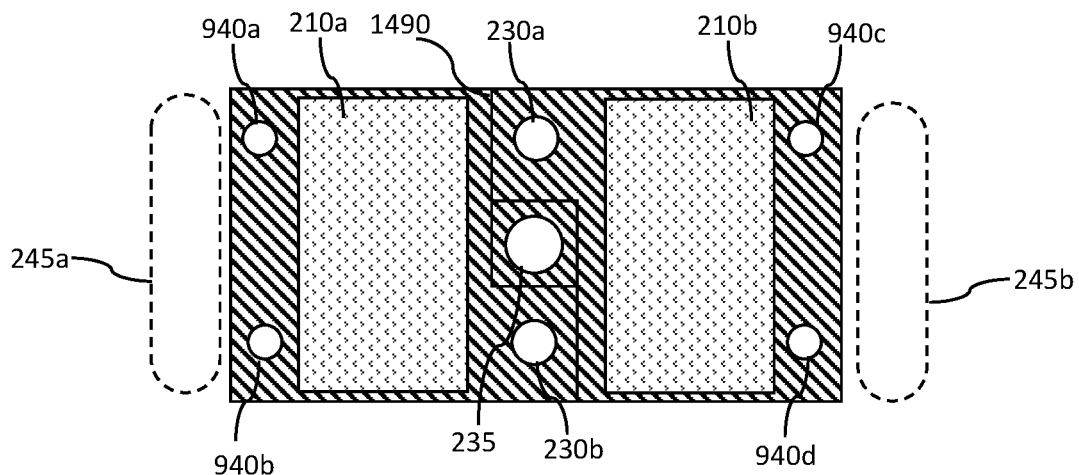
Figure 14B:
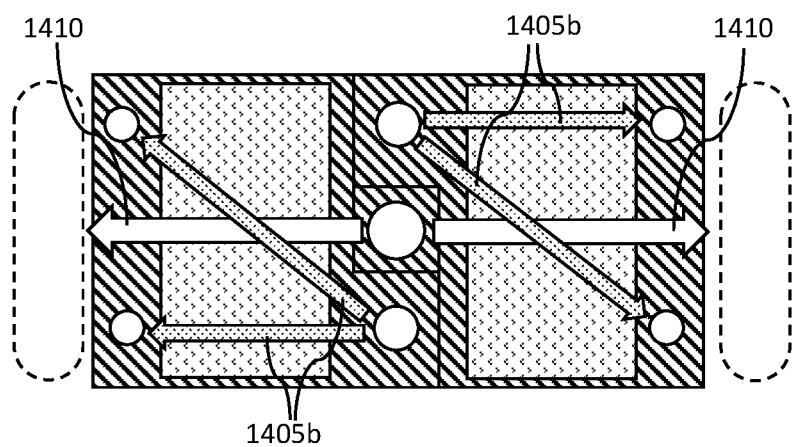
Figure 14C:
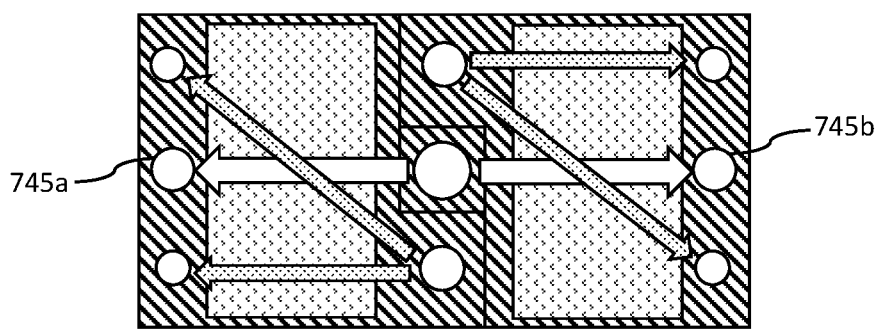

FIGS. 13*a*-*c* show a plan view of a cell unit having first fluid end ports disposed toward each corner of the cell unit, two first fluid mid-ports and two second fluid mid-ports; and, FIGS. 14*a*-*c* show a plan view of a cell unit comprising two metal support plates.

Figure 2A:
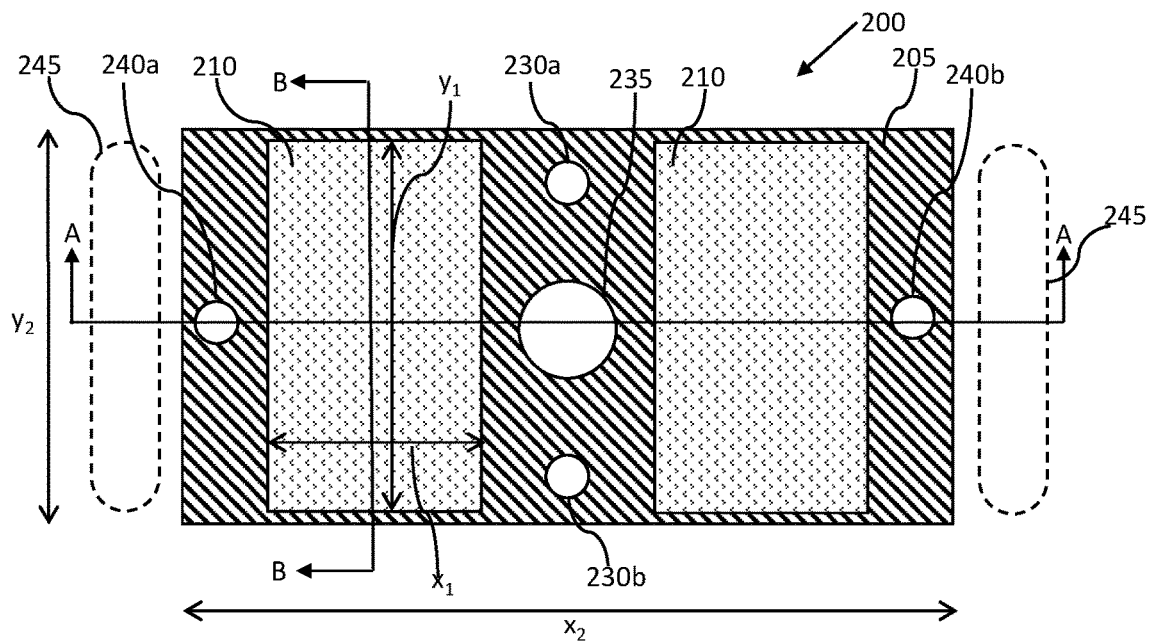

FIG. 2*a* shows a first example of a cell unit 200 which, like the prior art cell, is a coupon comprising a spacer (i.e. three component layers).

The cell unit 200 has a substrate in the form of a rectangular metal support plate 205 upon which is deposited two separate active cell chemistry regions, namely electrochemically active layers 210. The two electrochemically active layers 210 are in a side-by-side arrangement.

Figure 2B:
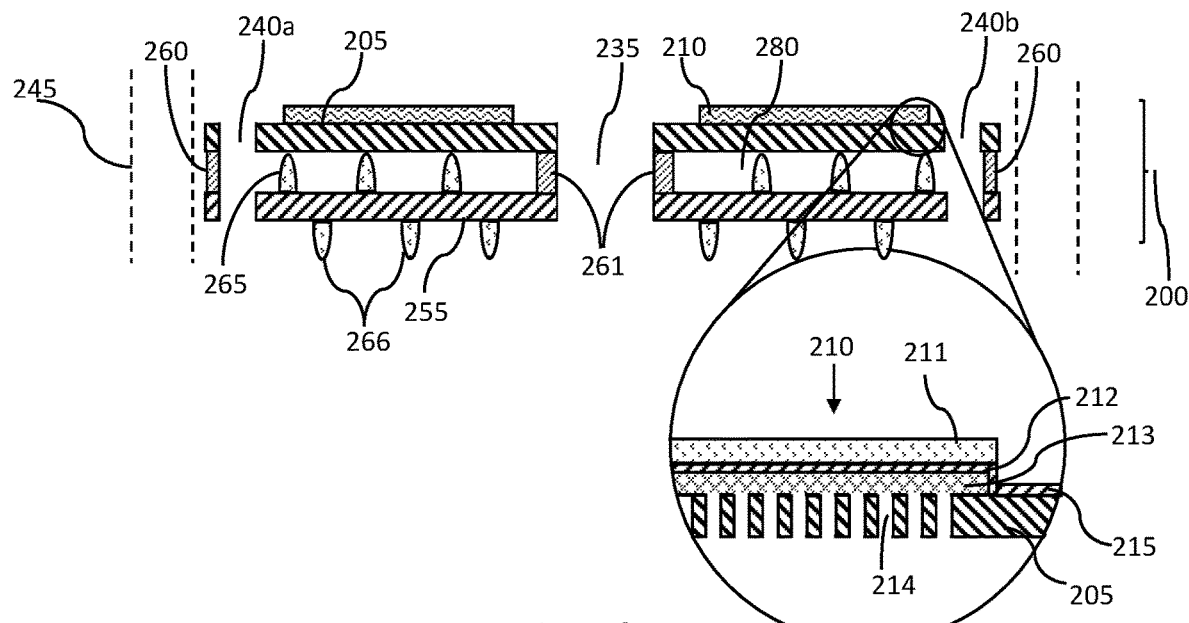

FIG. 2*b* is a side cross-sectional view lengthwise along line A-A of the cell unit 200 of FIG. 2*a*. FIG. 2*b* shows an electrochemically active layer 210 in more detail. Each cell unit 200 comprises cell chemistry layers 211, 212, 213 deposited or coated upon the metal support plate 205 to form the electrochemically active layer 210. An anode layer 213, an electrolyte layer 212 and a cathode layer 211 are successively laid down over a porous region 214. However, in some cell arrangements that order may be reversed (such that the cathode layer is closest to the substrate).

The metal support plate 205 is a metal (e.g. ferritic stainless steel) foil. The porous region 214 comprises an array of through-holes formed by drilling (or other means, for example etching) extending from the first side 225 to the opposite side (second side 226) of the metal support plate 205 and surrounded by a non-porous region.

The anode layer 213, electrolyte layer 212, and cathode layer 211 may be formed by deposition, e.g. chemical vapour deposition, electrostatic deposition, spray deposition, spin-on deposition, powder deposition or the like, onto the metal substrate 205. The process may be a two-stage process, with deposition of powder or granular material followed by sintering or other treatment to form each of the layers of the solid oxide cell. Each layer is a thin layer such that none of the layers is self-supporting; that is to say, the metal substrate is required to give support to the solid oxide chemistry layers. Other barrier layers may also be provided, for example an extended electrolyte layer 215.

The electrochemically active layers 210 may be formed directly on the metal substrate 205, alternatively they may be formed on a separate porous metal substrate which may be attached to a window-framed substrate. In the latter case, the two separate electrochemically active layers shown in FIG. 2 may be formed on two separate porous metal supports. However, this requires more components and more manufacturing steps.

Returning to FIG. 2a, there are two first fluid mid-ports 230a, 230b for delivery or removal of a first fluid to or from a first fluid volume and a single second fluid mid-port 235 for delivery or removal of a second fluid to or from a second fluid volume. The first fluid mid-ports 230a, 230b and the second fluid mid-port 235 are disposed between the two electrochemically active layers (or regions) 210 and are midway along the length of the cell unit.

The second fluid mid-port 235 is substantially centrally located along the first (longer) axis of the metal support plate 205 because it is positioned between the two electrochemically active layers 210. The single second fluid mid-port 235 is also substantially centrally located along the second (shorter) axis of the metal support plate 205 because it is positioned between the two first fluid mid-ports 230a, 230b. Thus, the second fluid mid-port 235 is substantially centrally located within metal support plate 205.

The first fluid mid-ports 230a, 230b are substantially centrally located along the first (longer) axis of the metal support plate 205 because they are positioned between the two electrochemically active layers 210 equidistant of the two cell ends. The first fluid mid-ports 230a, 230b are disposed away from the centre of the second (shorter) axis on either side of the second fluid mid-port 235; the first fluid mid-port 230a is disposed toward a first (longer) edge of the metal support plate 205 and the first fluid mid-port 230b is disposed toward a second (longer) edge of the metal support plate 205.

Sufficient distance is provided between the mid-ports 230a, 230b, 235, and between the mid-ports 230a, 230b, 235 and the electrochemically active layers 210 to allow for positioning of gaskets or shaped port features around the ports. However, gaskets may contact and sit on a barrier layer (for example, an extended electrolyte layer (not shown) that extends beyond the electrochemically active layers 210).

The cell unit 200 further includes a pair of first fluid end ports 240a, 240b respectively disposed one toward each end of the first (long) axis of the cell unit 200. The first fluid end ports are for delivery or removal of first fluid from a cell unit. The first fluid end ports 240a, 240b are closer to the ends of the first (long) axis of the cell unit 200 than the electrochemically active layers 210. The ports 230, 240 for the first fluid are thus arranged in a diamond shape.

External manifolds 245 represent a volume between the end of the cell unit 200 (i.e. end of metal support plate 205) and an internal edge of an enclosure which a stack comprising a plurality of cell units 200 is positioned. The second fluid may be delivered to or removed from a cell unit 200 by the external manifold 245.

Also represented in FIG. 2a are some of the dimensions of the extent of the electrochemically active layers 210 and the cell unit. Each electrochemically active layer is characterized by a minimum length $x_1$ across the electrochemically active layers between an edge of the electrochemically active layers proximal to the mid-port(s) and an opposed edge of the electrochemically active layers proximal to the end port. The minimum length $x_1$ may be generally parallel to two edges of the electrochemically active layers or/and generally perpendicular to two other edges of the electrochemically active layers. The length $x_1$ is parallel to a main component of the fluid flow path (see further in FIG. 4) between a mid-port and an end of the cell unit. Each electrochemically active layer is also characterized by a minimum width $y_1$ across the electrochemically active layers, the width being perpendicular to the length $x_1$ and to the main component of the fluid flow path. Together, the length $x_1$ and width $y_1$ define the aspect ratio of the electrochemically active layers as aspect ratio=$x_1/y_1$. In an example, the aspect ratio is less than or equal to 1.2.

The cell unit is characterized by its length $x_2$, which is generally parallel to the main component of the fluid flow path (i.e. parallel to a line from mid-port 235 to an end of the cell unit). The cell unit is characterized by its width $y_2$, which is generally perpendicular to the main component of the fluid flow path (i.e. parallel to a line from mid-port 235 to an end of the cell unit). In an example, the ratio $x_2/y_2$ is less than or equal to 2.4.

Figure 1:
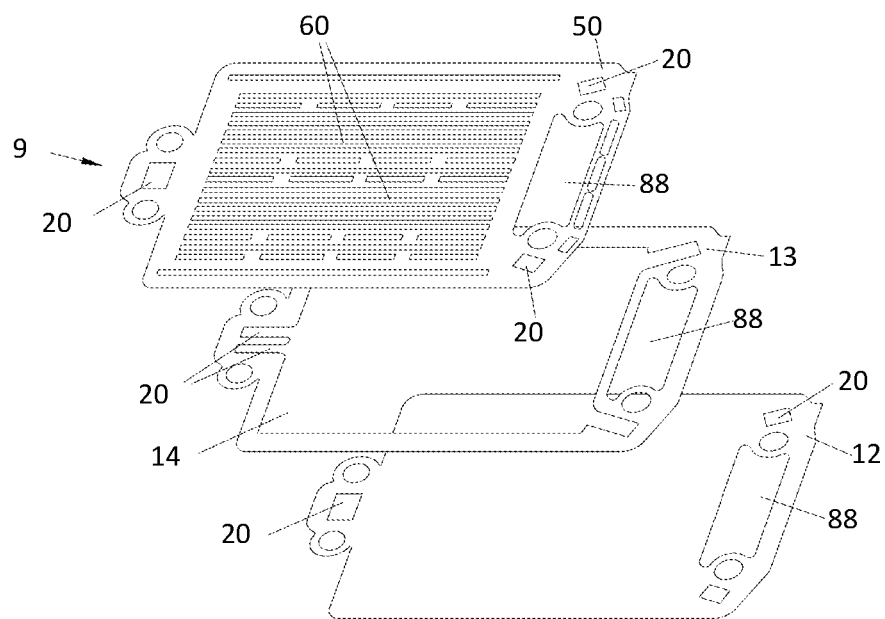

FIG. 2b is a side cross-sectional view along line A-A of the cell unit 200 of FIG. 2a. Cell unit 200 is a coupon, or repeating unit, comprising a metal support plate 205 with electrochemically active layers 210 deposited or coated thereon, and a separator plate 255 which is spaced from the second side (i.e. the side which does not carry the electrochemically active layer 210) of the metal support plate 205 by a spacer or gasket 260, whereby the coupon has an enclosed first fluid, volume 280. The spacer or gasket 260 may be a framelike component similar to the prior art spacer plate 13 of FIG. 1. Separation is also maintained by the formed port feature or gasket 261. If the formed port feature or gasket 261 is a formed port feature, then it is a continuous raised annulus welded or otherwise sealed (e.g. using a gasket or sealing paste) to seal the passageway in question. Formed port features will be described further with respect to FIG. 3. The spacer or gasket no and the formed port feature or gasket 261 seal the first fluid (in a first fluid passageway and supplied to the first fluid volume 280 by first fluid ports 240a,b) from the second fluid (in a second fluid passageway and supplied to the second fluid volume 285 by second fluid port 235), thus preventing intermixing.

This sealing may be achieved by welding or brazing through the coupon (i.e. through all of the metal support plate 205, the spacer or gasket 260 and 261, and the separator plate 255—such weld lines would be similar to those shown in the later FIG. 2d variant). See also later FIG. 4b which shows gaskets 262 around end ports 240a,b in the second fluid volume 285 that seal the first fluid end passageways 240a,b.

A fluid passageway for the first fluid is formed by the first fluid ports in the metal support plate 205, corresponding holes through the separator plate 255 and related gaskets or separators: first fluid middle passageway is formed by first fluid mid-ports 230a and corresponding holes through the separator plate 255 and related gaskets or separators. A second fluid middle passageway is formed by second fluid mid-port 235 and corresponding holes through the separator plate 255 and related gaskets or separators 261. A first fluid end passageway is formed within the area of the metal support plate 205 by the first fluid end port 240a, corresponding holes through the separator plate 255 and related gaskets or separators 260, and gaskets 262 (FIG. 4b).

The spacer or gasket 260 and 261 may be conductive, thereby providing electrical interconnection between the metal support plate 205 and the separator plate 255 of the coupon or repeating unit. Conductivity may be improved by welding or brazing through the coupon.

The separation between the metal support plate 205 and the separator plate 255 defines a first fluid volume 280. In the arrangement shown in FIG. 2b, wherein the anode layer is closest to the metal support plate 205, the first fluid volume is a fuel volume and the second volume is an oxidant volume (when operated in an SOFC mode).

The separation between the metal support plate 205 and the separator plate 255 may also be maintained by the support structure 265. Elements of the support structure 265 may be integral to the separator plate 255 (corrugated or pressed interconnector/bipolar plates with pressed features such as channels or dimples are web-known in the art) and shown as a plurality of domes, but may have other cross-sectional shapes such as pyramids, flat-topped pyramids, cones, domes or bumps. Elements of the integral support structure 265 protrude from the separator plate 255 toward the metal support plate 205 of the coupon and contact the second side (the side on which the electrochemically active layers 210 are not deposited or coated) of the metal support plate 205. Alternatively, the support structure 265 may be a separate component, in which case it may comprise a mesh, expanded metal, or a combination thereof.

The support structure 265 may be a conductive support structure which acts to electrically interconnect the metal support plate 205 and the separator plate 255, which may obviate the need to electrically interconnect the metal support plate 205 and the separator plate 255 using the spacer or gasket 260 and 261.

A integral second support structure 266 protrudes from the separator plate 255 away from the metal support plate 205 of the coupon. Elements of the support structure 266 are shown as a plurality of domes, but may have other cross-sectional shapes such as pyramids, flat-topped pyramids, cones, domes or bumps. Alternatively, the second support structure 266 may be a separate component from the separator plate 255, in which case it may comprise a mesh, expanded metal, or a combination thereof.

The second support structure 266 is usually a conductive support structure to enable interconnecting between adjacent coupons.

The integral support structure 265 and the support structure 266 may be formed in the separator plate 255 by pressing or forming the support structure 265 in a first direction and by pressing or forming the support structure 266 in a second direction. The first direction being toward the second side (the side which the electrochemically active layers 210 are not deposited or coated) of the metal support plate 205 and the second direction opposite to the first direction, that is the second direction is toward electrochemically active layers 210 of an adjacent coupon. The forming or pressing process means that there is a depression (not shown) on the opposite side of the separator plate 255 to the protrusion that is the support structure 265 or second support structure 266.

Figure 2C:
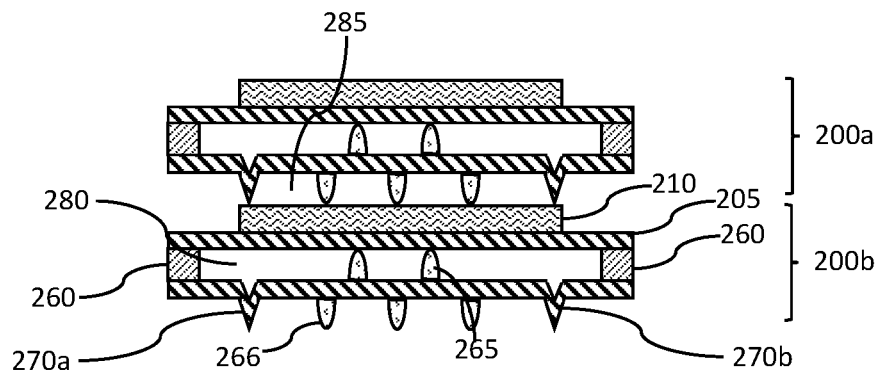

FIG. 2c shows a cross-sectional view of the cell unit 200 of FIG. 2a along line B-B of FIG. 2a. Thus, the cross-sectional view of FIG. 2c is perpendicular to that shown in FIG. 2b. However, a further cell unit 200b is additionally shown in this view—only—in order to show how the cell units interface in the stack direction.

A pair of ribs 270a,b are apparent in FIG. 2c. The ribs 270a,b are elongate protrusions, which extend from the separator plate 255 away from the metal support plate 205 of the cell unit or coupon 200 (i.e. toward the electrochemically active layers 210 of an adjacent cell unit), thus, the ribs protrude in the same direction as the second support structure 266. The ribs 270a,b are shown as having a pyramidal cross-section, but may have other cross-sectional shapes such as domes and may have flat or rounded tops. In contrast to the support structure 265 and the second support structure 266, the ribs are elongate. The ribs are elongate along the direction of the long axis of the cell unit 200 (into and out of the plane of FIG. 2c) and are sized and positioned to contact the electrochemically active layer of an adjacent cell unit or coupon 200 (as will be further described with reference to FIG. 4).

The rib 270 is integral to the separator plate 255 and is formed by pressing or forming the separator plate 255. Thus, the rib is a protrusion away from the metal support plate 205 and also a channel in the side of the separator plate 255 which faces the metal support plate 205. Hence, importantly, the rib forms both a channel in a first fluid volume 280 and a protrusion into a second fluid volume (as will be further described with reference to FIG. 4).

The distal end, or peak, of the rib 270 of a first cell unit 200a is arranged to contact the electrochemically active layer 210 of an adjacent cell unit 200b, and to contact at or near the edge of the electrochemically active layer 210. If the rib contacts the cathode layer 211 it acts to collect current from the cell unit (along with the conductive second support structure 266). Alternatively, the rib 270 may only contact the electrolyte layer 212 (because the cathode layer 211 typically has a lesser extent than the electrolyte layer 212). Because the rib 270 contacts the electrochemically active layer 210, it is not necessary to deposit a non-conductive coating (or provide a non-conductive layer) as would be necessary if the rib were to contact the metal support plate 205.

Figure 2D:
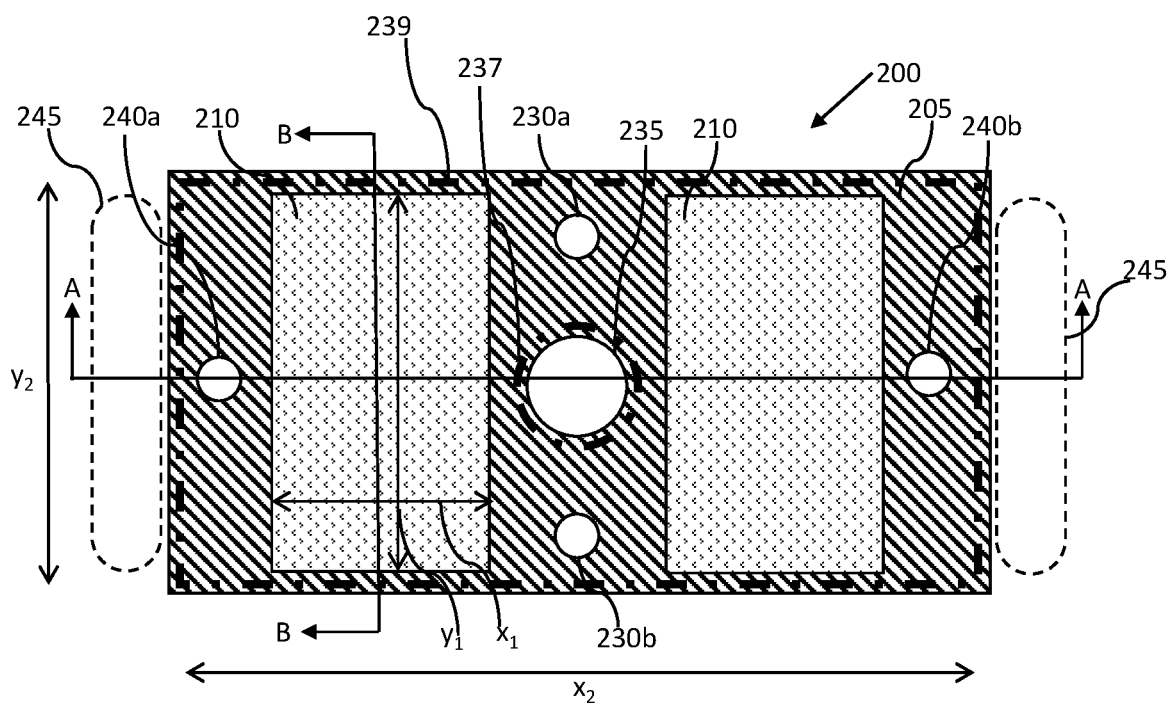
Figure 2E:
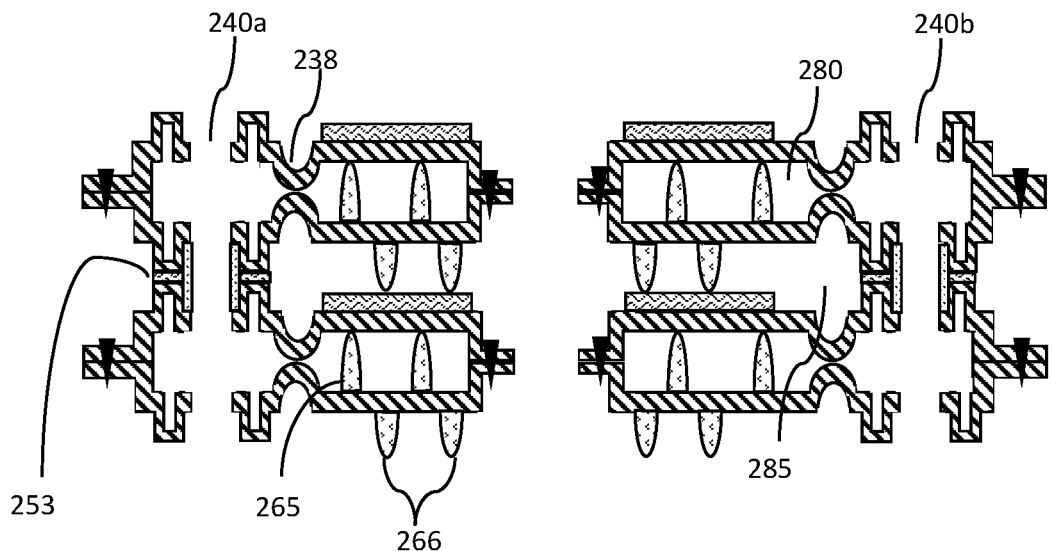
Figure 2F:
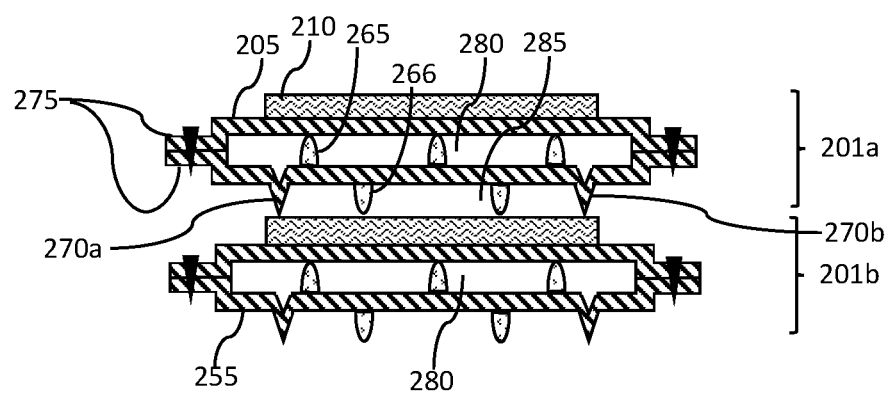

FIGS. 2d-2f show an alternative cell unit or coupon 201a,b comprising only two component layers, i.e. plates, namely the metal support plate 205 and separator plate 255. Any spacer plate is omitted and the first fluid volume 280 (e.g. fuel volume) is instead generated by the use of flange features and shaped port features as will be described.

FIG. 2d is a plan view and FIGS. 2e and 2f show cross-sectional views of the stacked spacerless cell units, or coupons, 201a,b. As in FIGS. 2b and 2c, each of the cell units 201a,b comprise a metal support plate 205 upon which electrochemically active layer 210 is deposited or coated, separator plate 255, and support structure 265 and second support structure 266 which are integral to—or separate from—the separator plate 255. Ribs 270a,b are similar to the ribs described with reference to FIG. 2c. It is apparent that the ribs 270a,b contact the electrochemically active layer 210 near the edge of said layer.

As shown in FIGS. 2e and 2f, the peaks or extremities of the second support structure 266 and the ribs 270 of a cell unit 201a contact the electrochemically active layer 210 of an adjacent cell unit 201b to space the cell unit 201a from the adjacent cell unit 201b. This creates the second fluid volume 285. As discussed above, the elements of the second support structure 266 are dome-shaped, pyramidal or cone-shaped (or similar), and thus do not form a restriction to movement of a second fluid within second fluid volume 285, However, the ribs are elongate and so restrict the second fluid (e.g. the oxidant) from flowing out of the second fluid volume in a direction perpendicular to the long axis of the ribs.

The cell unit 201a,b is further shown to have flanged perimeter features 275 around its perimeter. The flanged perimeter features 275 extend out of the predominant plane of the separator plate 255 and the metal support plate 205, as found at a central fluid volume area, to create a concavity (and a convexity to the outside surface) in the separator plate 255 and the metal support plate 205. The concavity forms the first fluid volume 280 within the fuel cell unit upon assembly of the fuel cell unit and allow the cell unit to be formed as a spacerless coupon, thereby reducing part count.

The flanged perimeter features 275 may be formed by pressing or forming, which may be formed concurrently with the support structure 265 and second support structure 266. The flanged perimeter features 275 are shown in both the metal support plate 205 and the separator plate 255, but may equally be formed in either the metal support plate 205 or the separator plate 255. Since it is harder to coat a shaped metal support plate with cell chemistry, it is more convenient if that does not contain flanged perimeter features.

FIG. 2d shows a weld line 239 around the flanged perimeter sealing the first fluid volume of the coupon. (The welds are shown in plan as a dashed line, and in cross section as triangles for stake welds.) A weld line 237 is also provided around second fluid mid-port 235 to seal the first fluid volume 280 from the second fluid volume 285.

In FIG. 2e, first fluid end ports 240a,b are provided with convex hardstop features 253 extending towards adjacent cell units. Such formed port features around these end ports require an insulating layer between cell units: either insulating, compressible sealing gaskets may be provided (e.g. located within an annular hard stop 253) or sealing paste may be applied to the hard stops and cured in situ to form an insulating layer.

The flanged perimeter features 275 serve to render redundant the spacer plate or gasket 260 of FIG. 2b,c. A gasket or spacer (such as gasket or spacer 261 of FIG. 2b) may remain around the port. Alternatively, as shown in FIGS. 2d-f, formed port features 238 may also be formed around each of the ports to replace the spacer and, in some examples, gaskets may also be replaced by formed port features.

Figure 3A:
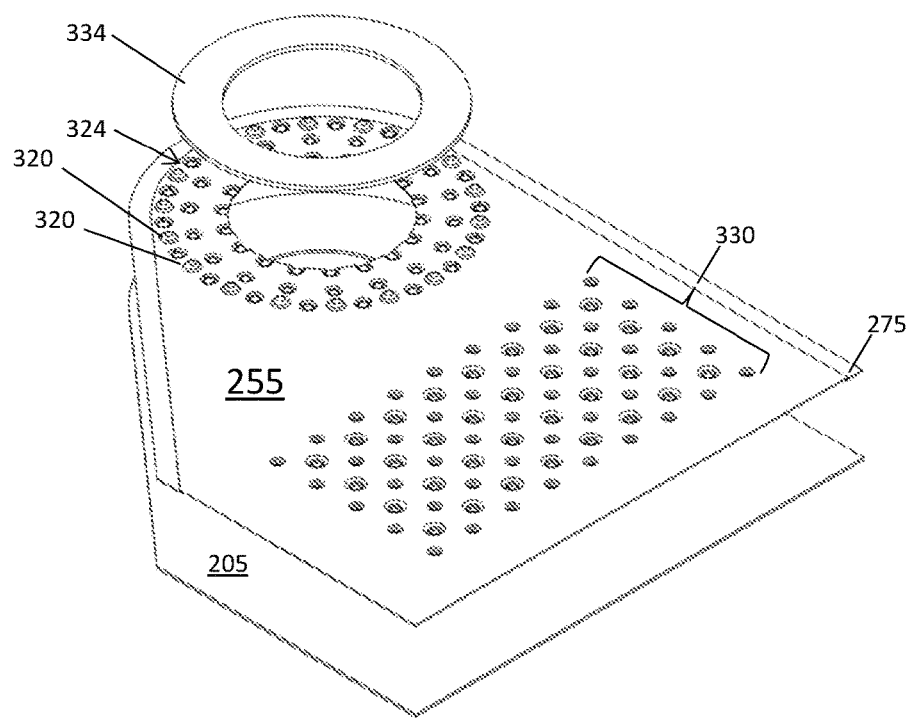
Figure 3B:
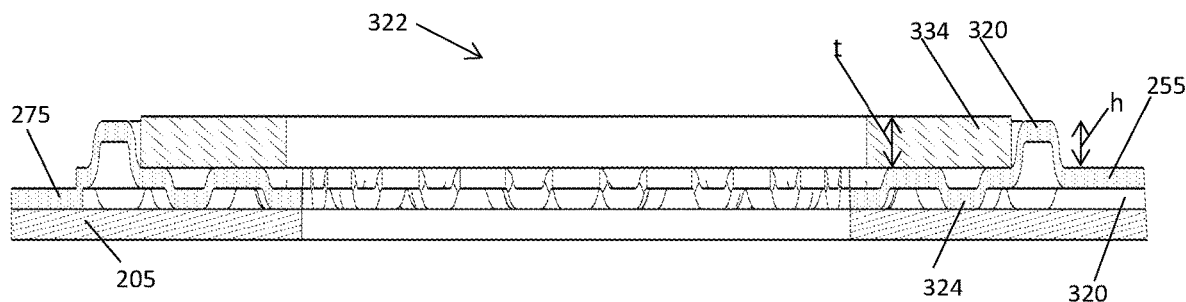

FIGS. 3a and 3b below provide details and examples of how formed port features may be formed around any or all of the ports shown in FIGS. 2a and 2d and thus explain how mid-ports may have structures that allow a mid-port to be in fluid communication with one type of fluid volume but be sealed from another fluid volume, as well as how 3D structures can ensure a sealing load/force is transferred in the stack direction. It will be apparent that in some cases the formed port features, such as dimples, allow fluid communication between a fluid chimney and a fluid volume, and in other cases the formed port features prevent fluid communication between a fluid chimney and a fluid volume. Gaskets positioned around a fluid chimney (and, in some cases located by the formed port features) may additionally or alternatively prevent fluid communication between a chimney and a fluid volume.

Figure 2G:
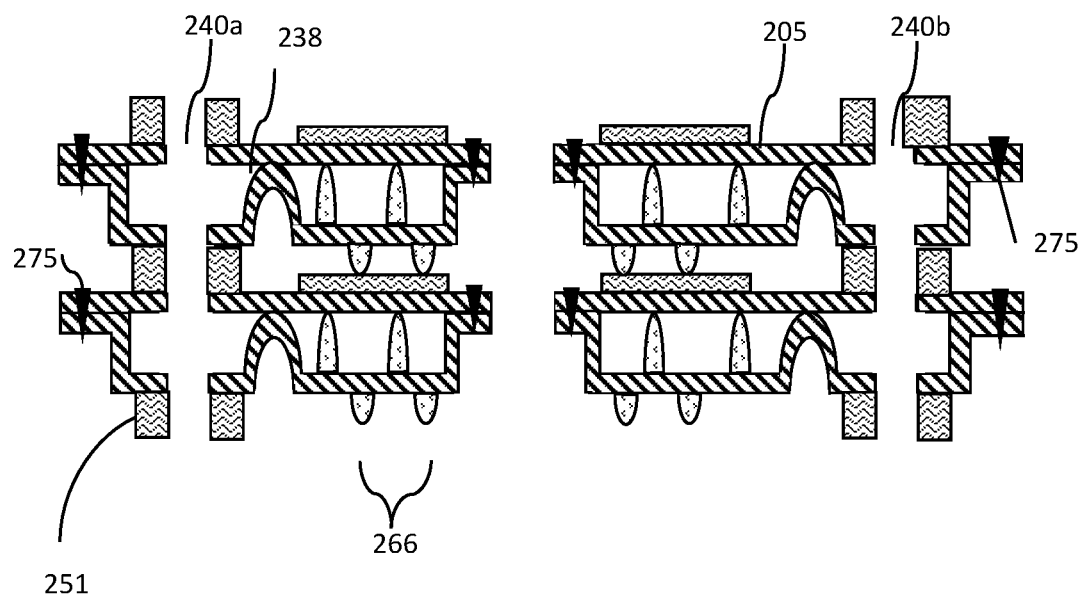

FIG. 2g shows a further spacerless coupon variant where conveniently the metal support plate 205 is flat and the flanged perimeter features 275 and (larger) shaped port features 238 are only provided in the metal separator plate 255. In this variant, the end ports 240a,b are sealed by traditional compressible, insulating gaskets 251 which define the end port (first) fluid passageways extending through the stack. Such gaskets 251 may be positioned during stack assembly by known alignment assembly methods; the gaskets need to be insulating between adjacent cell units since the cell units are arranged in series. The second fluid mid-port passageway is defined and sealed from the first fluid volume by a pressed flanged annular region around the second fluid mid-port 235 provided in the metal separator plate 255, which region is stake welded with an annular weld around the entire port.

Figure 2H:
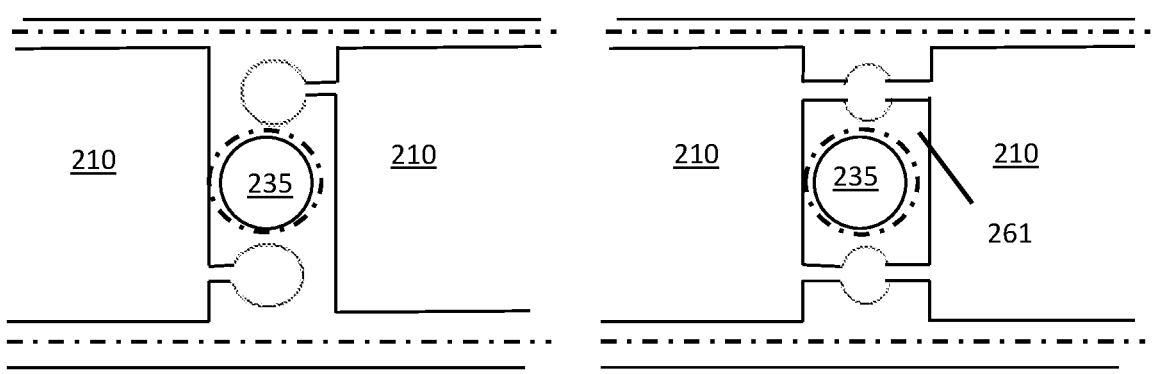

Lastly, FIG. 2h shows the middle sections of two alternative framed spacers that could be used in the spacered coupon of, for example, FIG. 2a, with the pairs of cell chemistry 210 shown either side of the line of mid-ports. In each case, a (dotted) weld line is shown around the perimeter and the central second fluid mid-port. The left hand spacer can be a single continuous spacer frame, which avoids locating a central spacer but means the first fluid can only exit through throats from each port. Furthermore, this version shows one first fluid mid-port dedicated/delivering to only one cell region. The right hand version shows each second fluid mid-port delivering to both chemistry regions; in this version, however, the separate central spacer 261 needs to be secured in position by the weld that seals the second fluid passageway; additional anchored spacer components 261 could be provided if additional throats were required. It will be appreciated that a cell unit with an internal spacer in the vicinity of a mid-port should have a spacer structure that transmits force to seal the passageway in the stack direction, yet have throats to allow fluid to exit the port into the coupon interior fluid volume.

In the three respective cell unit variants (i.e. both spacer and spacerless) of FIG. 2 it is desirable to have the first fluid volume as a fuel volume and for that volume to be sealed by a perimeter weld through all of the respective plate components of the cell units around the entire perimeter of the cell and by a weld around the second fluid mid-port (or more generally any internally manifolded second fluid port passageway).

By way of example FIGS. 3a and 3b show how port features may be formed with port features depicted in perspective and cross-sectional view. The port is shown as being at a curved corner of a cell unit, but the formed port features described with reference to FIG. 3 may equally be disposed around any of the ports described herein.

FIG. 3 shows a fluid port 322 surrounded by shaped port features 324 and a gasket 334 provided for covering over the recesses formed by the shaped port features 324 during assembly. The shaped port features 324 are, provided in the separator plate 255. The shaped port features 324 extend down to contact metal support plate 205, their lowermost surfaces lying in a first plane, the same plane as the flanged perimeter features 275, whereas their uppermost surfaces and the remainder of the separator plate 255 lie in a second plane spaced from the metal support plate 205 so as to define a fluid volume 320. Fluid volume 320 is one of the first and second fluid volumes 280, 285.

The shaped port features 324 have grooves at the innermost area, which grooves are open to the fluid port 322. There are then two staggered rings of circular recesses, followed by a final ring of alternating grooves and circular recesses, which grooves have a length of approximately twice the diameter of the circular recesses. In this embodiment, the grooves radially align with the circular recesses of the inner of the two staggered rings, and are staggered relative to the grooves at the innermost area. The circular recesses of that final ring instead radially align with the circular recesses of the second of the two staggered rings of circular recesses. This arrangement creates passageways for allowing fluid to flow between the recesses in the inside of the fuel cell unit (from the fluid port into the inside of the fuel cell unit, or in the opposite direction, if venting).

In addition to the recesses and/or grooves forming the shaped port features 324, raised members 320 are provided. These raised members 320 are located in a ring external of the outer perimeter of the gasket 334 and provide, two functions:

Firstly, they provide a guide for the location of the gasket 334 as the gasket can fit internally of the ring of raised members 320, thus seating in the correct position relative to the fluid port 322, i.e. centred relative to the fluid port 322, during assembly of the stack of cell units.

Secondly, as shown in FIG. 3b, the raised members 320 have a height h that is less than, or preferably between 75 and 99% of, or more preferably 75 to 85% (e.g. 78-82%) of, the thickness t of the gasket 334. The ratio of height h to thickness t can be tailored to the compression requirements of the particular gasket used. Although to provide the first function such a large height h is not necessary, and thus it could instead be less tall (e.g. h could be between 5 and 75% of the thickness t of the gasket), it is preferred to be the larger height to provide the second function of providing a hard stop during assembly and stacking of the stack. This hard stop function can be helpful during manufacture of the fuel cell stack as by virtue of the gasket being compressible, to thus enable it to seal over the recesses in the outer surface of the fuel cell unit upon compression, there is a possibility of over compression of the stack during assembly, which over compression could crack or otherwise damage the electrochemically active layers on the metal support plate as the support structures 265, 266 are also brought into contact with those electrochemical layers during that gasket compression. By having a hard stop, a limit can be set for that degree of compression, whereby over compression could be resisted by the hard stops, thus preventing inadvertent cracking of the electrochemically active layers on the metal support plate (and thus better tolerances for the engagement pressures within the fuel cell between the central projections and the electrochemically active layers).

In an alternative, the raised members 320 may be a continuous annular raised member. Formed port features, used herein, refers to one or both of the raised members 320 and shaped port features 324.

It is important, however, for these raised members 320 not to be taller than the thickness t of the gaskets 334 as otherwise the gasket cannot be compressed during the stacking process, and similarly the electrical connection between the electrochemically active layer and the central projections could fail to be made, thus preventing the efficient operation of the stack, and introducing potential for hot-spots within it. Nevertheless, the actual height h of the raised members 320, may be varied or set at appropriate for achieving during assembly the required compression of the gasket, and thus the correct connection between the electrochemically active layer and the central projections, to ensure there is proper sealing over of the recesses in the outer surface of the fuel cell unit by the gasket and correct electrical connections across the whole set of central projections 330. An electrically insulating coating or paste layer may be used on one or both of the abutting surfaces (the hard stop surface, formed by raised members 320, and metal substrate of the adjacent fuel cell unit) of adjacent fuel cell units to prevent electrical contact between adjacent fuel cell units via the abutting surfaces.

In a variant of this, instead of the raised members surrounding the outer perimeter of the gasket 334, the gasket could have forms or holes within it to accommodate the raised members 320, thus again providing a fixed position for the gasket relative to the raised members 320, and potentially a fixed orientation for the gasket relative thereto (or fixed orientations, if the gasket can fit in more than one fixed orientation).

In a variant of this, the raised members 320 surrounding the outer perimeter of the gasket are formed on the metal support plate 205 extending towards the separator plate 255 of a neighboring fuel cell unit. In a further variant, raised members are formed on the metal support plate 205 and the separator plate 255, these raised members may be spaced from one another. Further, the raised members on the metal support plate 205 and separator plate 255 may be of an intermediate height and arranged such that their raised features abut one another to form interfacing raised members having the same total height as the case where the height of the raised members is provided by raised members on the separator plate 255 or metal support plate 205, or spaced from one another on both the separator plate 255 and metal support plate 205.

FIG. 4 shows the cell unit 200 of FIGS. 2a-c with example fluid flow paths extending between the ports in the cell unit 200. Shaded arrows 405 represent fluid flow paths of the first fluid and blank arrows 410 represent fluid flow paths of the second fluid. Typically, the first fluid may be fuel and the second fluid may be oxidant (or air) when operating in SOFC mode. Generally, the mid-port(s) are fluid inlet ports. As a result, fluids which are input to the cell unit, which are hot fluids, are input toward the centre of the cell unit. This decreases stack warm-up time and encourages even thermal distribution. Nonetheless, if the mid-port is an outlet port (and thus fluid enters the fluid volume at each respective opposed end), even thermal distribution is encouraged by symmetrical flow paths toward the mid-port.

Figure 4A:
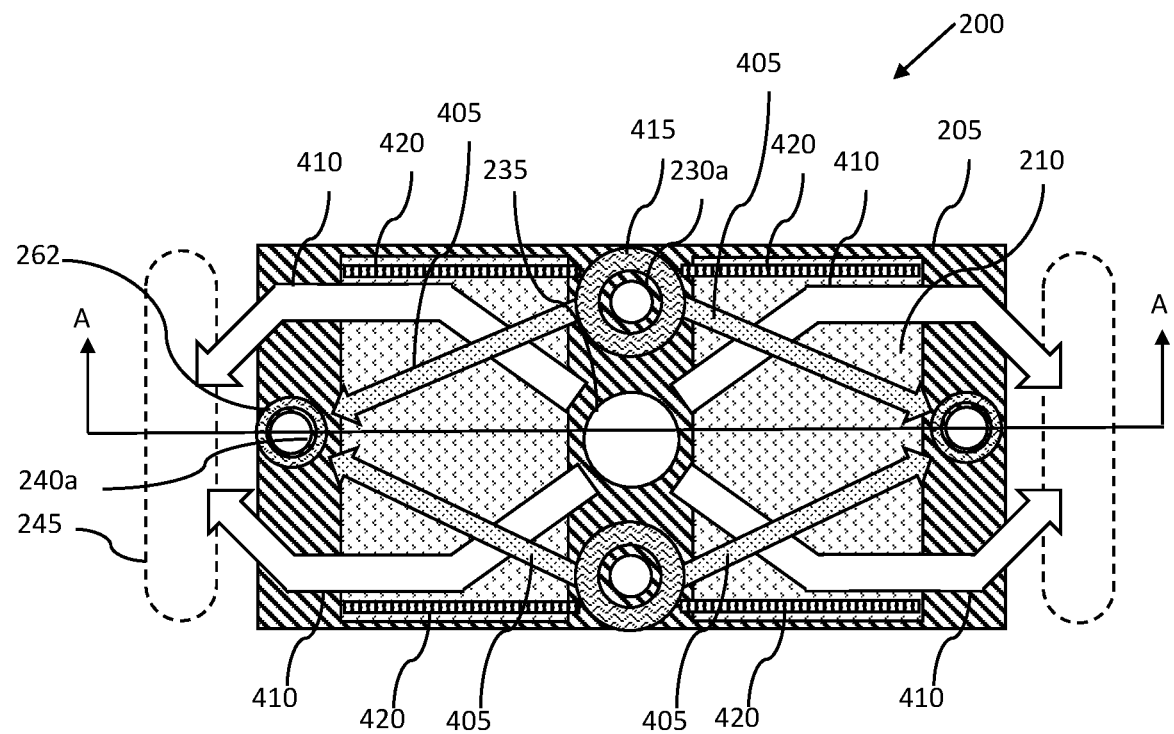
Figure 4B:
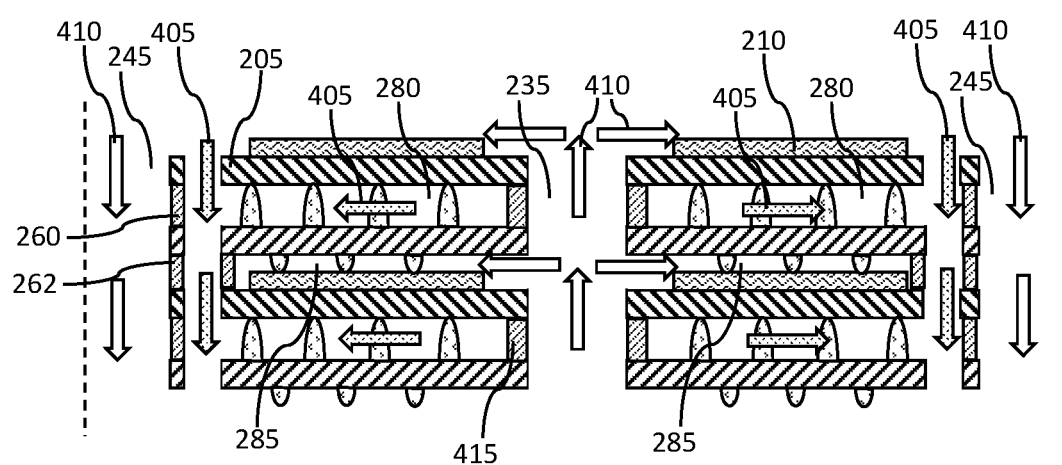

FIG. 4a shows the fluid flow paths between the various passageways in plan view, while FIG. 4b shows the fluid flow paths in cross-sectional view, the cross-section being along line A-A of FIG. 4a. In FIG. 4a, the arrows 405, 410 representing fluid flow paths of the first and second fluids should be understood as representing the flow paths on the second and first sides, respectively, of metal support plate 205 (i.e. obviously the flow depicted by arrows 405 would not be visible in plan view as it occurs underneath the metal support plate 205 (i.e. those arrows could alternatively have been shown as dotted arrows). This is apparent in FIG. 4b, wherein the second fluid flow path 410 is in the second fluid volume 285 and is over the (active chemistry coated) first side of the metal support plate 205, I.E. over the cathode layer 213 of the electrochemically active layer 210. As also shown in FIG. 4b, the first fluid flow path 405 is in the first fluid volume 280 and is over the second side of the metal support plate (in fluid communication with the anode layer 211 via the porous region 214).

The first fluid flow path 405 is between the first fluid mid-ports 230a,b and the pair of first fluid end ports 240a,b. The direction of the arrows represent the first fluid flow path direction; in this case, the first fluid mid-ports 230a,b are inlet ports to allow fluid into the first fluid volume 280, and the first fluid end ports are outlet or exhaust ports to allow fluid out of the first fluid volume 280. The first fluid (e.g. fuel) is fully internally manifolded.

The second fluid flow path 410 is between the second fluid mid-port 235 and external manifold 245. The direction of the arrows represent that second fluid flow path direction; the second fluid mid-port 235 is an inlet port to allow fluid into the second fluid volume 285, and the external manifold allows fluid out of the second fluid volume 285. The external manifold may merely be a gap or spacing between the cell and an outer jacket or housing. The second fluid mid passageway is formed by the second fluid mid-port 235 and the passageway is sealed from the first fluid volume by forming an annular port feature (see FIG. 3) or gasket 415. If the latter is a conductive gasket or spacer, or if it is an annular formed port feature, then the mid passageway may be sealed by welding or brazing around the mid-port and through the conductive gasket or formed port feature.

Thus, the first and second fluid flow paths extend from their respective mid-ports and are symmetrical about the mid-ports. It will be appreciated that the flow paths are shown schematically with arrows indicating the general direction of flow and, in fact, the flow will generally radiate or fan out from each port across the cell chemistry since it is not confined as it exits or spreads out over the cell chemistry. In particular, there are no three-dimensional channels forcing the flow in a particular tortuous flow path, rather the flow is unconstrained except at or near the perimeter of the electrochemically active layers 210. Thus, while an arrow is shown to represent the flow path from, for example, first fluid mid-port 230a to first fluid end port 240a, that arrow represents a plurality of flow paths between said ports, ensuring that the each part of the electrochemically active layers 210 are supplied with first fluid and exhaust fluid is removed from each part of the electrochemically active layers 210. However, each of the plurality of flow paths between said ports represented by the arrow has a main component in the length direction of the cell unit, i.e. between an edge of the electrochemically active layers 210 which is proximal to the mid-port 230a and an opposed edge of the electrochemically active layers 210 which is proximal to the end port 240a (which is also parallel to the cell unit length). The same is true for all other fluid flow paths described herein.

Further, with reference to FIG. 3 it will be understood that flow to and from each port is radial (at least in the vicinity of the ports); that is the shaped port features do not direct the flow in any specific direction (access to the ports is non-directional or isotropic).

Raised port features (as described with reference to FIG. 3, not shown in FIG. 4) and/or interconnect dimples 265 may allow the mid-ports to avoid collapse. The raised port features described with respect to FIG. 3 provide a method for sealing the mid-port passageways and for enabling supply from the passageways to the fluid volumes.

Represented in FIG. 4a is also the position of gaskets 415 around first fluid mid-ports 230 and gaskets 262 around first fluid end ports 240. Gaskets 415 and 262 contact the first side (which is also the side supporting the electrochemically active layers 210) of the metal support plate 205. In a stack of cell units, as FIG. 4b, the gaskets 415 and 262 are disposed between the metal support plate 205 and the separator plate 255 of the next cell unit, and separate the first and second fluid volumes 280, 285.

Represented in FIG. 4a is also the area 420 where the ribs 270 contact the electrochemically active layers 210. The ribs 270 are parallel to the length of the cell unit and contact the electrochemically active layers 210 along the edges of the electrochemically active layers 210. Thus, the ribs 270 act to contain the second fluid (e.g. air) in the second fluid volume 285, as is represented by the second fluid flow path 410 in FIG. 4a.

As shown in FIG. 4a, the ribs extend past the edge of the electrochemically active layers 210, but in this extended region the ribs 270 contact or are positioned above an insulating electrolyte layer which extends beyond the edge of the electrochemically active layers 210 shown in FIG. 4a.

The ribs 270 (as represented in the figure by the area 420 that the ribs 270 contact) extend toward the outer edge of the gaskets 415 of the mid-ports 230, and may contact the outer diameter of the gaskets 415. Thus, the gaskets 415 (which contain the first fluid) and the ribs 270 cooperate (to form a continuous barrier) to direct the second fluid by restricting the second fluid from exiting the second fluid volume 285 in a direction perpendicular to the length of the cell. That is, the gaskets 415 and ribs 270 confine the second fluid and direct the second fluid flow path 410 from the second fluid mid-port 235 over the electrochemically active layers 210 and to the external manifold 245. The gaskets 262 around the first fluid end ports 240 also restrict the second fluid flow path 410 to flow around the gaskets 262.

First fluid thus enters the first fluid volume 280 midway along the length of the cell unit 200 and exits near the ends of the cell unit. Likewise, second fluid enters the second fluid volume 285 midway along the length of the cell unit 200 and exits past the ends of the cell unit. This allows improved thermal management. It also allows a low aspect ratio arrangement for first and second fluid volumes, wherein the first and second fluid flow paths 405, 410 are across the short side (roughly half the cell length) of the electrochemically active layers 210, rather than across the long side (roughly the cell width) of the electrochemically active layers 210. Low aspect ratio means that the ratio between width (distance between inlet and outlet ports), labelled $x_1$ in FIG. 2a, and length, labelled $y_1$ in FIG. 2a, of active cell chemistry layers is less than or equal to 1.2 (i.e. $x_1/y_1 \leq 1.2$). In an example, the aspect ratio is less than 1, in another example the aspect ratio is less than 0.8, in another example the aspect ratio is between 0.3 and 0.8. Having a low aspect ratio arrangement reduces pressure drop between inlet and outlet of the volume, and reduces the thermal gradient across them.

The rib 270 is proximal to the first fluid mid-port and is a depression when viewed from the first fluid volume 280, and thus forms a delivery channel for delivery of first fluid (e.g. fuel) to the first fluid volume 280, whereby first fluid may bleed out of the rib along its length. This encourages fluid to flow to the outermost corners of the active chemistry region (and stack) thereby encouraging uniform flow over the region despite the single first fluid central end port 240.

In FIGS. 4a and 4b, first and second fluid flow path directions are shown (by the direction of the arrows) from the centre of the cell unit 200 to the ends of the cell unit 200. Various alternatives are described with respect to FIGS. 4c, 4d, and 4e. Each of FIGS. 4c, 4d, and 4e have similar positioning of ports within the cell unit 200 to that described with respect to FIGS. 2*a*-*d*, 4*a*, and 4*b*.

Figure 4C:
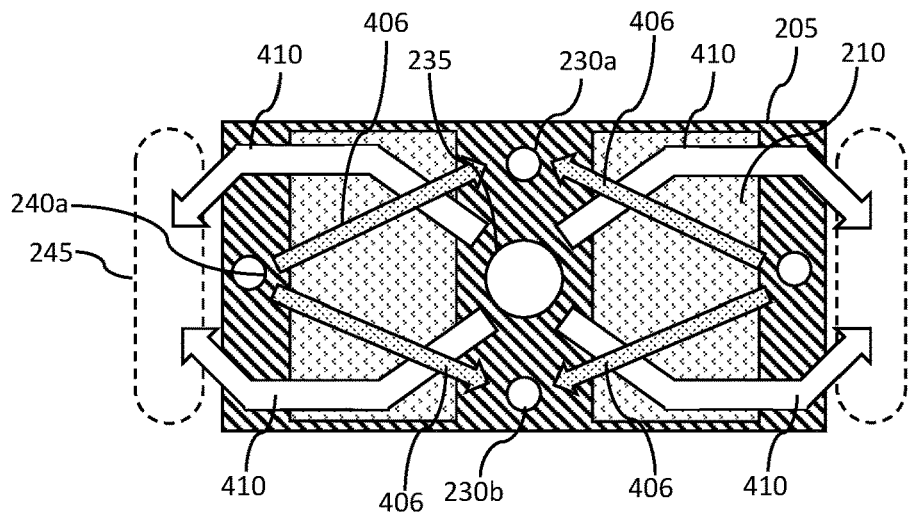

FIG. 4*c* shows a counter-flow arrangement in which the first fluid flow path direction is generally in an opposite direction to the second fluid flow path direction. The direction of the second fluid flow path 410 remains from the centre of the cell to the edge of the cell, but the direction of the first fluid flow path 406 is arranged to be from the end of the cell unit to the centre of the cell unit. That is, the first fluid flows from the first fluid end ports 240 to the first fluid mid-ports 230.

Figure 4D:
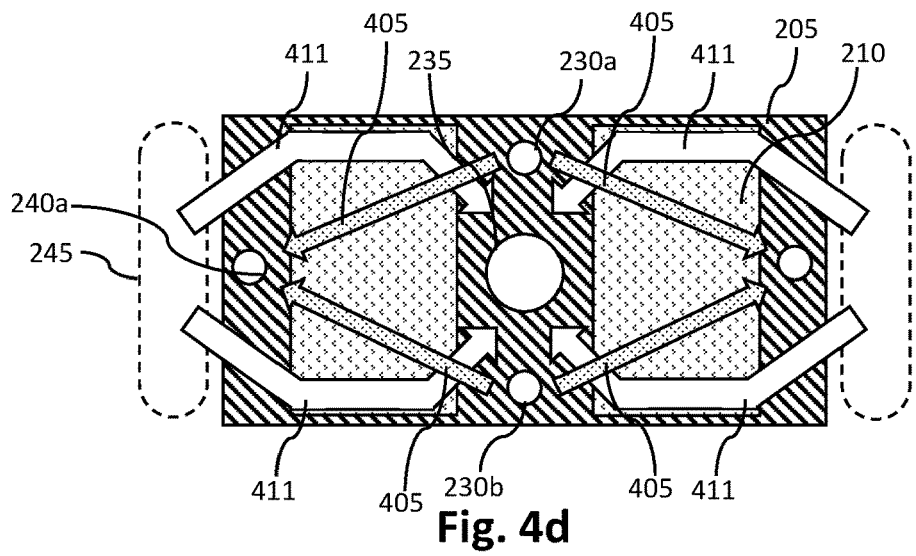

FIG. 4*d* shows second counter-flow arrangement. In this case, the directions of the first fluid flow path 405 is from the centre of the cell to the ends of the cell, but the direction of the second fluid flow path 411 is arranged to be from the ends of the cell unit to the centre of the cell unit. That is, the second fluid flows from the external manifold 245 to the second fluid mid-port 235.

Figure 4E:
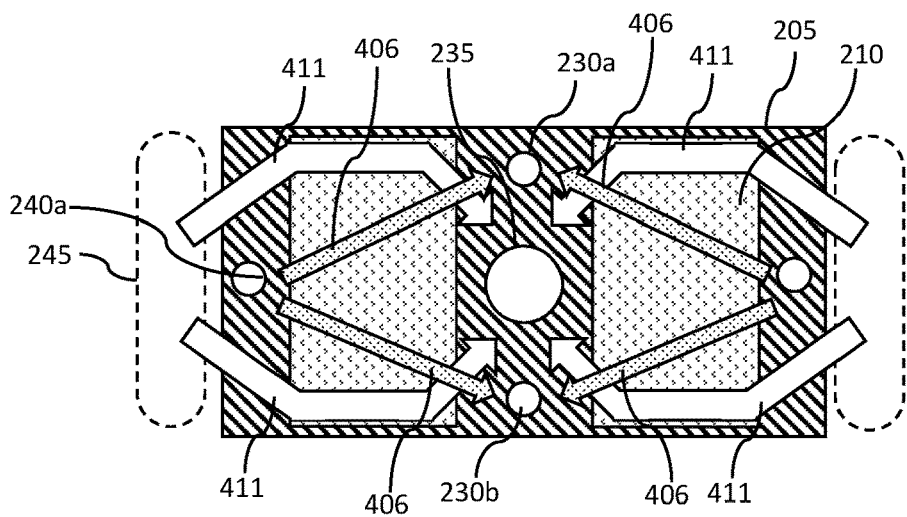

FIG. 4*e* shows a co-flow arrangement (in this sense it is similar to the co-flow arrangement of FIGS. 4*a* and 4*b*) in which the first and second fluid flow paths are generally in the same direction. In this case, the direction of the first fluid flow path 406 is arranged to be from the ends of the cell unit to the centre of the cell unit. That is, the first fluid flows from the first fluid end ports 240 to the first fluid mid-ports 230. The direction of the second fluid flow path 411 is arranged to be from the ends of the cell unit to the centre of the cell unit. That is, the second fluid flows from the external manifold 245 to the second fluid mid-port 235.

Figure 4F:
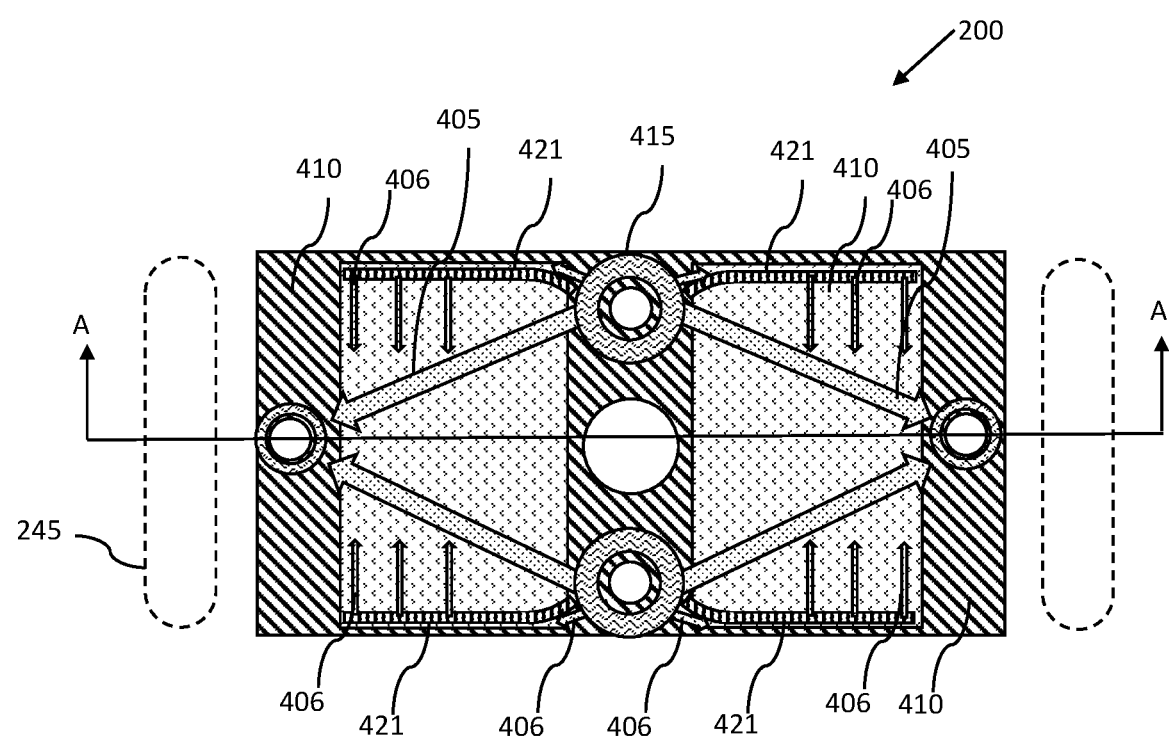

FIG. 4*f* shows the cell unit 200 of FIG. 4*a* with an alternative rib arrangement. Again the discontinuous ribs 270 in the separator plate (as represented in the figure by the area 420 that the ribs 270 contact) extend toward the outer edge of the gaskets 415 of the mid-ports 230, but the rib ends curve towards the port (in a hockey stick shape) to minimise any gap between the rib and a gasket. The second fluid (air/oxidant) flow paths are not shown for clarity of figure, but will be similar to those shown in FIG. 4*a*. Some air escapes between end of rib and gasket, but the curving decreases this distance (therefore the escape) to a minimum. (An example of a cell with a continuous cell chemistry region and a single continuous rib is show in FIG. 8.)

The ribs improve fuel distribution to the corners of the cell by providing a fuel fluid delivery channel in the first fluid (fuel) volume from which additional fuel flowpaths 406 can branch. In one test, the ribs lead to more than 10% increase in fuel down the rib.

Figure 5:
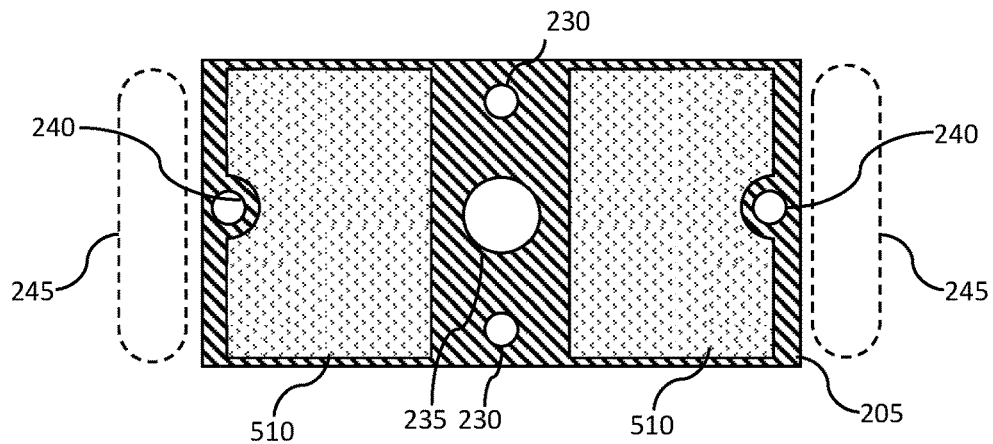
FIG. 5 shows a plan view of a cell unit having wrapped electrochemically active layers.

FIG. 5 shows a variant in which the electrochemically active layers 510 are wrapped around the first fluid end ports 240, i.e. the electrochemically active layers extend at least partially around the port, preferably with a correspondingly contoured edge of the electrochemically active layers. Extending at least partially around the ports means that it the corresponding contour may be >90 degrees, or >180 degrees, or a 360 degrees (e.g. FIG. 8*a*). In other respects, electrochemically active layers 510 are similar to electrochemically active layers 210 described previously. The edge of the electrochemically active layers 510 which is proximal to the first fluid end port 240 is deposited in a semi-circular or arc shape to follow the circular shape of the port 240. An annular gap between the end port 240 and the electrochemically active layers 510 allows for positioning of a gasket (for example gasket 262 described with respect to FIG. 4*a*) around the end port 240, which annular gap means that the gasket does not contact the cathode of the electrochemically active layers 510. The gasket may touch and sit on an extended electrolyte layer. Alternatively or additionally, the annular gap provides space for formed port features surrounding the port. The wrapped electrochemically active layers 510 allows the edge of the electrochemically active layers 510 to be disposed further toward the end of the metal substrate 205 (e.g. level with the middle of end port 240), thus allowing the electrochemically active layers 510 to cover a greater proportion (with respect to not having a wrapped electrochemically active layer) of the metal substrate 205.

The electrochemically active layers 510 may additionally or alternatively be wrapped around any of the other ports in the cell unit, for example around the first and or second fluid mid-ports, in a similar manner to the wrapping around the first fluid end ports 240.

Figure 6:
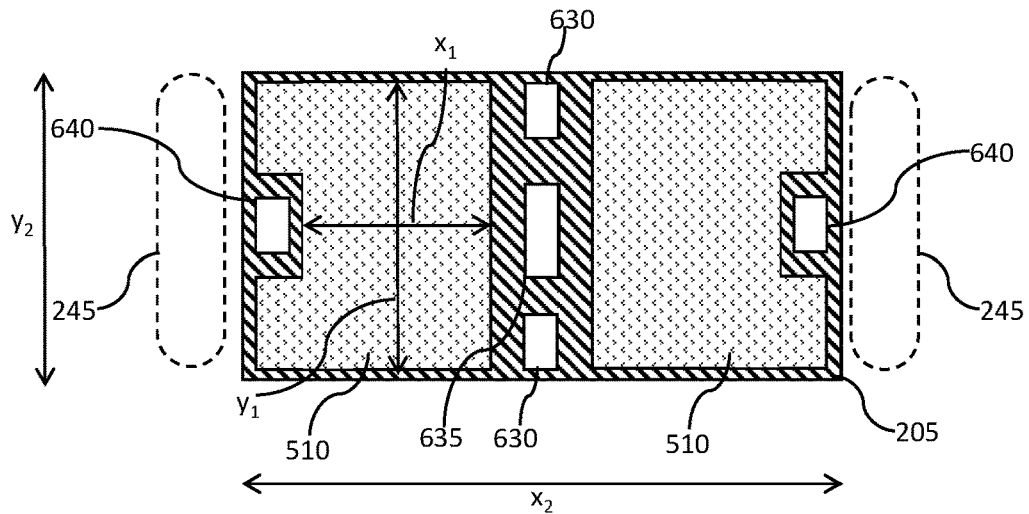
FIG. 6 shows a plan view of a cell unit having ports which are rectangular in cross-section.

FIG. 6 shows a variant in which the first and second fluid ports are non-circular, otherwise the ports are similar to those described previously. Each of the ports are shown as rectangular, but they may equally be elliptical or square. Again, the electrochemically active layers 510 are shown wrapped around the first fluid end ports 640. Wrapping is more desirable for circular or oval ports than rectangular or square ports which take up less space in the metal support plate 205. Further, by using mid-ports which are elongate along the mid line (such that the mid-ports are longer in the direction of the shorter axis of the cell unit than they are wide in the direction of the longer axis of the cell unit) the mid-ports 630, 635 take up substantially all the area of the metal support plate 205 between the electrochemically active layers 510 thus allowing the electrochemically active layers 510 to cover a greater proportion of the metal substrate 205.

With regard to the earlier discussion of desirable dimensions, the minimum length $x_1$ and minimum width $y_1$ of the electrochemically active layers are added for illustrative purposes in this case (similar could be added to FIG. 5). The width $y_1$ is similar to that in FIG. 2*a*. The length $x_1$ is that which is a minimum across the electrochemically active layers between an edge of the electrochemically active layers proximal to the mid-port and an edge of the electrochemically active layers proximal to the end port. The length $x_1$ is parallel to an edge of the electrochemically active layers and to an edge of the cell unit (e.g. the length thereof).

Wrapping of the active area leads to the possibility of fuel starvation at the furthermost corner chemistry regions and hence the combination of wrapping of cell chemistry and the provision of shaped delivery channels/ribs to provide delivery channels to allow fuel to reach those outermost corners of the cell chemistry is highly desirable. In this way, an increased proportion of the metal support plate can be covered with electrochemically active layers and high energy densities achieved.

Figure 7:
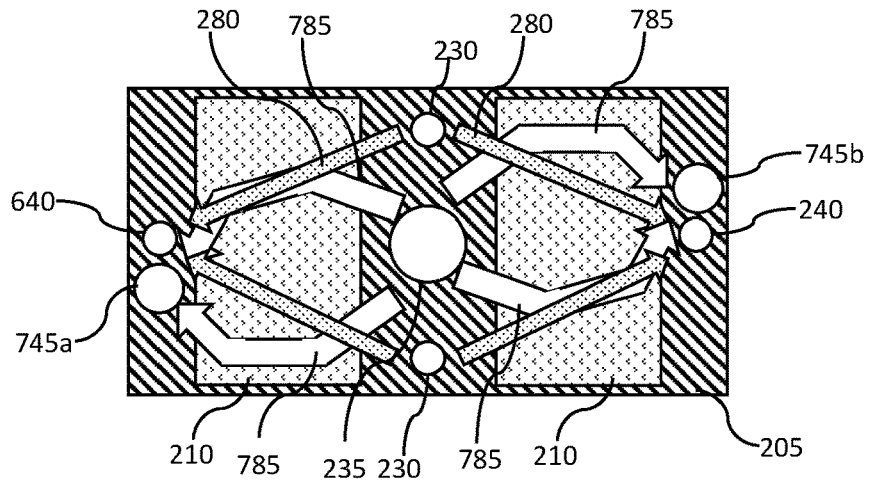
FIG. 7 shows a plan view of a cell unit, similar to the cell unit of FIG. 4, wherein the second fluid is internally manifolded.

FIG. 7 shows a variant cell unit in which the second fluid is also internally manifolded, otherwise the cell unit is similar to the units described previously. The cell unit is provided with a pair of offset second fluid end ports 745*a* and 745*b* respectively disposed one toward each end of the first (long) axis of the cell unit 200. The second fluid end ports are for delivery or removal of second fluid from a cell unit. The second fluid end ports 745*a*, 745*b* are closer to the ends of the first (long) axis of the cell unit 200 than the electrochemically active layers 210. The second fluid end ports replace the external manifold 245 of the preceding figures, and form an end fluid passageway in the stack for the second fluid. Because the second fluid is fully internally manifolded (using mid-port 235 and end ports 745), the end of the cell unit may be positioned much closer to the internal end of an enclosure in which the stack is placed.

One second fluid end port is shown at each end of the cell unit, but more may be provided. For example, there may be two second fluid end ports at each end of the cell unit, with a first fluid end port disposed therebetween. This would conserve symmetry to homogeneous flow.

FIG. 7 also shows the fluid flow paths and fluid flow directions (represented by the arrows) in plan view. The first fluid flow path 405 and flow direction is as described with reference to FIGS. 4a and 4b. The second fluid flow path 785 is between the second fluid mid-port 235 and the second fluid end ports 745a,b. The direction of both the first fluid (on first fluid flow path 405) and the second fluid (on second fluid flow path 785) is shown to be from the centre, or mid-ports, of the cell unit to the ends of the cell unit. That is, the first and second fluid flow path directions are in a generally co-flow arrangement, similar to the arrangement described with respect to FIGS. 4a and 4b. Equally, either of the first and second fluid flow path directions can be reversed to provide a counter-flow arrangement, similar to the arrangement described with respect to FIGS. 4c and 4d, or both of the first and second fluid flow path directions can be reversed to provide a co-flow arrangement, similar to the arrangement described with respect to FIG. 4e. Further, it is to be understood that any of the other variants described previously or subsequently can have the second fluid volume fully internally manifolded in the manner of FIG. 7.

FIGS. 8a and 8b show a further variant cell unit in which the there is a single electrochemically active layer 810 in contrast to the two separate active layers 210 described previously. In other respects, the variant is similar to the cell unit described previously. The single electrochemically active layer 810 surrounds the first and second fluid mid-ports 230, 235. That is, a portion of the electrochemically active area 810 is disposed between the mid-ports 230, 235 and the long edges of the cell unit, this means that the electrochemically active layer is one continuous area. The single electrochemically active layer 810 may thus cover a greater proportion of the metal support plate 205 than in the case of two electrochemically active layers 210.

FIG. 8b shows the cell unit of FIG. 8a with example fluid flow paths extending between the ports in the cell unit. The first fluid flow path 405 and the second fluid flow path 410 are similar to the fluid flow paths described with reference to FIGS. 4a and 4b, and one or both may be reversed similar to that described in FIGS. 4c to 4e.

Also shown in FIG. 8b is the area 820 contacted by a continuous rib 270 provided in the separator plate of an adjacent cell unit in the stack. The area 820 and associated rib are similar to the two areas 420 and two ribs along each long edge of the cell unit in FIG. 4a, except that in this variant the area 820 contacted by the rib and associated rib are continuous along the length of the cell unit so as to eliminate any air bypass from between the gasket and a rib end. As previously, the rib is a rib along the length of the separator plate of an adjacent cell unit, which contacts a first cell unit when first and adjacent cell units are positioned in a stack. That is, the area 820 contacted by the rib is along the electrochemically active layers 810 disposed either side of the mid-ports and along the portion of the electrochemically active layers 810 which is between the mid-ports and the long edge of the cell unit. A rib, contacting the area 810, thus acts to contain the second fluid in the second fluid volume. The rib is proximal to the first fluid mid-port and is a depression when viewed from the first fluid volume, and thus forms a delivery channel for delivery of first fluid to the first fluid volume, whereby first fluid may bleed out of the rib along its length.

FIGS. 9a-c show a variant in which there is a single first fluid mid-port and no second fluid mid-port, in other respects the variant is similar to those previously described. The first fluid mid-port 930 is centrally located within the cell unit. First fluid end ports are disposed toward the corners of the cell unit. Thus, the first fluid ports form a cross of "X" shape.

The second fluid is externally manifolded, as represented by external manifold 245a disposed at a first end of the cell unit and external manifold 245b disposed at a second end of the cell unit. External manifolds 245a and 245b are similar to the external manifold 245 described previously and may each extend in the stacking direction.

The electrochemically active layer 810 surrounds the first fluid mid-port 930 in a similar manner to the electrochemically active layer 810 described with reference to FIG. 8. Alternatively, the electrochemically active layer may comprise separate electrochemically active layers, similar to electrochemically active layers 210 described previously. Alternatively still, there may be more than one first fluid mid-port disposed along the centre of the length of the cell unit, similar to two the fluid mid-ports described previously with respect, to FIGS. 2 and 4.

FIG. 9b shows a first fluid flow path 905 and a second fluid flow path 910 for the variant cell unit of FIG. 9a. The first fluid flow path 905 takes the form of a cross or "X" shape.

The second fluid flow path is between the external manifold 245a at the first end of the cell unit and the external manifold 245b at the second end of the cell unit. The second fluid flow path 910 is contained within the second fluid volume by ribs (projecting from the separator plate of an adjacent cell unit) which contact the electrochemically active layer 810 at areas 820. The second fluid flow path 910 passes around the first fluid mid-port 930 and a gasket (not shown) which surrounds the first fluid mid-port 930 to separate the first and second fluid volumes.

The direction of the first fluid flow path is indicated from the mid-port 930 to the end ports 940. The direction of the second fluid flow path is shown from the external manifold 245a at the first end of the cell unit to the external manifold 245b at the second end of the cell unit. Thus, the flow is co-flow across half of the cell unit and is counter-flow across a second half of the cell unit. Similarly, the direction of the first fluid flow path may be reversed, such that the first fluid flows from the first fluid end ports 940 toward the first fluid mid-port 930, in which case the flow is again co-flow across half of the cell unit and is counter-flow across a second half of the cell unit. Co-flow across half of the cell unit and is counter-flow across a second half of the cell unit leads to an unsymmetrical thermal distribution, which is not advantageous.

FIG. 9c shows a variation on the arrangement of FIGS. 9a, 9b in which the second fluid is internally manifolded using second fluid end ports 745a and 745b. The second fluid end port 745a is disposed toward a first end of the cell unit and second fluid end port 745b is disposed toward a second end of the cell unit. The second fluid end port 745 at each end of the cell unit is located midway along the end of the cell unit and between the first fluid end ports 940 (one first fluid end port 940 being located toward each corner of the cell unit). First fluid flow path 905 and the first fluid flow direction are similar to that described with respect to FIG. 9b. Similarly, the second fluid flow path 910 and the second fluid flow direction are similar to that described with respect to FIG. 9b.

FIGS. 10a,b show a further variant cell unit in which the first and second fluids are in a cross-flow arrangement. There is a single first fluid mid-port 930 and no second fluid mid-port. Further, there are no first fluid end ports, and instead the first fluid is externally manifolded, as represented by external manifolds 1040a and 1040b disposed at first and second ends, respectively, of the cell unit. The external manifolds 1040 are outside of the area covered by the metal support plate 205 and form the end fluid passageways for the first fluid.

There are provided fluid side-ports 1041, 1046 in fluid communication with the second fluid volume, for delivery and exhaust of second fluid. The side ports are disposed along the long edge of the metal support plate 205, beyond the electrochemically active layers 810. As shown in FIG. 10, two fluid side-ports 1041 are disposed along a first edge of the metal support plate 205 and a further two side-ports 1046 are disposed along a second edge of the metal support plate 205, the first and second edges being opposite with the electrochemically active layers 810 therebetween.

FIG. 10b shows a first fluid flow path 1005 and a second fluid flow path 1010 for the variant cell unit of FIG. 10a.

The first fluid flow path 1005 is between the first fluid mid-port 930 and the external manifolds 1040a, 1040b. The second fluid flow path 1010 is between the fluid side-ports 1041 at the first edge of the cell unit and the fluid side-ports 1046 at the second edge of the cell unit. The second fluid flow path 1010 passes around the first fluid mid-port 930 and a gasket (not shown) which surrounds the first fluid mid-port 930 to separate the first and second fluid volumes.

The direction of the first fluid flow path 1005 is indicated from the mid-port 930 to the external manifolds 1040a,b. The direction of the second fluid flow path 1010 is shown from the fluid side-ports 1041 at the first edge of the cell unit to the fluid side-ports 1046 at the second edge of the cell unit. Thus, the flow is cross-flow arrangement across the cell unit. Similarly, the direction of the first fluid flow path may be reversed, such that the first fluid flows from the external manifolds 1040a,b toward the first fluid mid-port 930, in which case the flow is again cross-flow across the cell unit.

Where the cell repeat unit is, for example, a sealed unit with a sealed fluid volume with both cell end ports and cell mid-ports providing internal manifolding, then the other fluid may be externally manifolded for both inlet and/or outlet purposes.

FIGS. 11a-c show a further variant cell unit in which there are four first fluid end ports and two second fluid mid-ports. The two second fluid mid-ports 1135a,b are disposed midway along the cell unit's length, with electrochemically active layers coated or deposited between the second fluid mid-ports 1135a,b and the ends of the cell unit. A first fluid mid-port 1130 is disposed midway along the cell unit's length and between the two second fluid mid-ports 1135a,b.

Toward each corner of the cell unit is disposed a first fluid end port 940. The first fluid end ports 940 are distal from it the midpoint of the cell unit's width. The first fluid end ports 940 and the first fluid mid-port 1135 are in fluid communication with one another. Thus, the first fluid end ports 940 and the first fluid mid-port 1130 form a cross or "X" shape with the first fluid midport 1130 at the centre of the cross. External manifolds 245 are in fluid communication with the second fluid mid-ports 1135a,b.

FIG. 11b shows a first fluid flow path 1105 and a second fluid flow path 1110 for the variant cell unit of FIG. 11a. The first fluid flow path 1105 is between the first fluid mid-port 1130 and the first fluid end ports 940. The second fluid flow path is between the second fluid mid-ports 1135a,b and the external manifolds 245. The direction of the first fluid flow path 1105 is indicated from the mid-port 1130 to the first fluid end ports 940. The direction of the second fluid flow path 1110 is shown from the fluid mid-ports to the external manifolds 245 at the ends of the cell unit. Thus, the flow is symmetrical about two axes of the cell unit. The flow is co-flow arrangement across the cell unit. The direction of the first fluid flow path may be reversed, such that the first fluid flows from the first fluid end ports 940 toward the first fluid mid-ports 1130, in which case the flow is counter-flow across the cell unit. Equally, the flow direction of the second fluid flow path 1110 may be reversed, such that the second fluid flows from the external manifolds 245 to the second fluid mid-ports 1135, in which case the flow is counter-flow across the cell unit. If both the first fluid flow direction and the second fluid flow direction are reversed (relative to that indicated by the arrows in FIG. 11b), then both fluids flow toward the centre of the cell unit in a co-flow arrangement.

FIG. 11c shows a variation on the arrangement of FIGS. 11a, 11b in which the second fluid is internally manifolded using second fluid end ports 745a and 745b. The second fluid end port 745a is disposed toward a first end of the cell unit and second fluid end port 745b is disposed toward a second end of the cell unit. The second fluid end port 745 at each end of the cell unit is located midway along the end of the cell unit and between the first fluid end ports 940 (one first fluid end port 940 being located toward each corner of the cell unit). First fluid flow path 1105 and the first fluid flow direction are similar to that described with respect to FIG. 11b. Similarly, the second fluid flow path 1110 and the second fluid flow direction are similar to that described with respect to FIG. 11b.

FIGS. 12a-c show a further variant cell unit in which there are two first fluid mid-ports and two second fluid mid-ports. The fluid mid-ports are disposed midway along the cell unit's length and toward the sides of the cell unit (i.e. they are spaced from the mid-line in the width direction of the cell unit). Disposed toward a first side of the cell unit are a first fluid mid-port 1230a and a second fluid mid-port 1235a, whose centres are aligned on an axis parallel to the length direction of the cell unit. The first fluid mid-port 1230a is further away from the external manifold 245a (disposed at the left-hand end of the cell unit) than the second fluid mid-port 1235a. Disposed toward a second side of the cell unit are a first fluid mid-port 1230b and a second fluid mid-port 1235b, whose centres are aligned on an axis parallel to the length direction of the cell unit. The axis on which the mid-ports 1230b and 1235b are aligned is symmetrically disposed about the mid-line of the width direction of the cell with respect to the axis on which the mid-ports 1230a and 1235a are located. The second fluid mid-port 1235b is further away from the external manifold 245a (disposed at the left-hand end of the cell unit) than the first fluid mid-port 1230b. Electrochemically active layers, are coated, or deposited between the mid-ports 1230a,b and 1235a,b and the ends of the cell unit. First fluid end ports 240 are disposed toward the end of the cell unit and external manifold 245 is disposed beyond the cell unit, as previously described. Thus, the first fluid ports are disposed in a diamond shape.

FIG. 12b shows a first fluid flow path 1205 and a second fluid flow path 1210 for the variant cell unit of FIG. 12a.

The first fluid flow path 1205 is between the first fluid mid-ports 1230a,b and the first fluid end ports 240. The second fluid flow path 1210 is between the second fluid mid-ports 1235a,b and the external manifolds 245.

The direction of the first fluid flow path 1205 is indicated from the first fluid mid-ports 1230a,b to the first fluid end ports 240. As flow from each port is isotropic, fluid from the first fluid mid-port 1230*a* flows around the second fluid midport 1235*a* (and attendant gasket or shaped port features) to reach the first fluid end port 240*a* (a portion of the electrochemically active layers and the second fluid mid-port 1235*a* being located between the first fluid mid-port 1230*a* and the first fluid end port 240*a*). Likewise, fluid from the first fluid mid-port 1230*b* flows around the second fluid midport 1235*b* to reach the first fluid end port 240*b*.

The direction of the second fluid flow path 1210 is shown from the second fluid mid-ports 1235*a,b* to the external manifolds 245 at the ends of the cell unit. Fluid from the second fluid mid-port 1235*a* flows around the first fluid midport 1230*a* (and attendant gasket or shaped port features) to reach the external manifold 245*b* (a portion of the electrochemically active layers and the first fluid mid-port 1235*a* being located between the second fluid mid-port 1235*a* and the external manifold 245*b*). Likewise, fluid from the second fluid mid-port 1235*b* flows around the first fluid midport 1230*b* to reach the external manifold 245*b*.

Thus, the flow is generally symmetrical about two axes of the cell unit. The flow is co-flow arrangement across the cell unit. The direction of the first fluid flow path may be reversed, such that the first fluid flows from the first fluid end ports 240 toward the first fluid mid-ports 1230, in which case the flow is counter-flow across the cell unit. Equally, the flow direction of the second fluid flow path 1210 may be reversed, such that the second fluid flows from the external manifolds 245 to the second fluid mid-ports 1235, in which case the flow is counter-flow across the cell unit. If both the first fluid flow direction and the second fluid flow direction are reversed (relative to that indicated by the arrows in FIG. 12*b*), then both fluids flow toward the centre of the cell unit in a co-flow arrangement.

FIG. 12*c* shows a variation on the arrangement of FIGS. 12*a*, 12*b* in which the second fluid is internally manifolded using second fluid end ports 745*a* and 745*b*. The second fluid end port 745*a* is disposed toward a first end of the cell unit and second fluid end port 745*b* is disposed toward a second end of the cell unit. The second fluid end port 745 at each end of the cell unit is located substantially midway along the end of the cell unit but may be disposed to one side of midway such that the first fluid end ports 240 and second fluid end ports 745 are offset in opposite directions from the midway point of the end of the cell unit. First fluid flow path 1205 and the first fluid flow direction are similar to that described with respect to FIG. 12*b*. Similarly, the second fluid flow path 1210 and the second fluid flow direction are similar to that described with respect to FIG. 12*b*.

FIGS. 13*a-c* show a further variant cell unit in which there are two first fluid mid-ports 230 and one second fluid mid-port 235, similar to those described with reference to FIG. 2. Also shown are first fluid end ports 940 respectively disposed toward each corner of the cell unit, similar to those described with reference to FIG. 9.

FIG. 13*b* shows a first fluid flow path 1305 and a second fluid flow path 1310 for the variant cell unit of FIG. 13*a*.

The first fluid flow path 1305 is between the first fluid mid-ports 230*a,b* and the first fluid end ports 940. The second fluid flow path 1310 is between the second fluid mid-port 235*a* and the external manifolds 245.

The direction of the first fluid flow path 1305 is indicated from the first fluid mid-ports 230*a,b* to the first fluid end ports 240. The direction of the second fluid flow path 1310 is indicated from the second fluid mid-port 235 to the external manifolds 245 at the ends of the cell unit.

Thus, the flow is symmetrical about two axes of the cell unit. The flow is co-flow arrangement across the cell unit.

The direction of the first fluid flow path 1305 may be reversed, such that the first fluid flows from the first fluid end ports 940 toward the first fluid mid-ports 230, in which case the flow is counter-flow across the cell unit. Equally, the flow direction of the second fluid flow path 1310 may be reversed, such that the second fluid flows from the external manifolds 245 to the second fluid mid-ports 235, in which case the flow is counter-flow across the cell unit. If both the first fluid flow direction and the second fluid flow direction are reversed (relative to that indicated by the arrows in FIG. 13*b*), then both fluids flow toward the centre of the cell unit in a co-flow arrangement.

FIG. 13*c* shows a variation on the arrangement of FIGS. 13*a*, 13*b* in which the second fluid is internally manifolded using second fluid end ports 745*a* and 745*b*. The second fluid end ports 745*a,b* are similar to those described previously with reference to FIG. 7. First fluid flow path 1305 and the first fluid flow direction are similar to that described with respect to FIG. 13*b*. Similarly, the second fluid flow path 1310 and the second fluid flow direction are similar to that described with respect to FIG. 13*b*.

FIGS. 14*a-c* show a further variant cell unit in which a divider, partition, or baffle may be provided to divide the first fluid volume or the second fluid volume by providing some obstruction to flow that allows respective mid-ports to mainly direct their fluid to a particular cell chemistry region, such that there is one fluid volume associated with each of the electrochemically active layers. The divider could also fluidly isolate the fluid volume into two volumes, but that would require perimeter sealing such as welding.

As previously described with reference to FIG. 2, there is a single second fluid mid-port 235 which is disposed midway along the cell unit's length and width. The second fluid mid-port is in fluid communication with external manifolds 245. Two first fluid mid-ports 230*a,b* are disposed midway along the cell unit's length, positioned one to each side of the second fluid mid-port 235 and a first fluid end port is provided toward each corner of the cell unit.

A divider 1490 is provided on or contacting the second side of the metal support plate 205, which separates the fluid volume on that side of the metal support plate into two volumes. The divider 1490 is shown as present in the first fluid volume on the second side of the metal support plate 205. The divider divides the volume such that the first fluid mid-port 230*a* is in fluid communication with the first fluid end ports 940*c,d* towards the second end of the cell unit and electrochemically active layers 210*b*, and the divider divides the volume such that the first fluid mid-port 230*b* is in fluid communication with the first fluid end ports 940*a,b* towards the first end of the cell unit and electrochemically active layers 210*a*.

The divider 1490 may be a feature formed or pressed in either the metal support plate 205 or the separator 255, similar to the formed port features and may be formed in the same manufacturing step as the forming or pressing of the formed port features.

FIG. 14*b* shows a first fluid flow path 1405 and a second fluid flow path 1410 for the variant cell unit of FIG. 14*a*. The second fluid flow path 1410 is between the second fluid mid-port 235*a* and the external manifolds 245. The first fluid flow path 1405 is between the first fluid mid-ports 230*a,b* and the first fluid end ports 940. First fluid flow path 1405 includes first and second sub-paths 1405*a* and 1405*b*, which are separated by the divider 1490. The first sub-path 1405*a* is between the first fluid mid-port 230*b* and the first fluid end ports 940*a,b*, and in fluid communication with electrochemically active layers 210*a*. The second sub-path 1405*b* is between the first fluid mid-port 230a and the first fluid end ports 940c,d, and in fluid communication with electrochemically active layers 210b.

The direction of the first fluid flow path 1405 is indicated from the first fluid mid-ports 230a and 230b to the first fluid end ports 940c,d and 940a,b, respectively. The direction of the second fluid flow path 1410 is indicated from the second fluid mid-port 235 to the external manifolds 245 at the ends of the cell unit.

The flow is co-flow arrangement across the cell unit. The direction of the first fluid flow path 1405 may be reversed, such that the first fluid flows from the first fluid end ports 940 toward the first fluid mid-ports 230, in which case the flow is counter-flow across the cell unit. Equally, the flow direction of the second fluid flow path 1410 may be reversed, such that the second fluid flows from the external manifolds 245 to the second fluid mid-ports 235, in which case the flow is counter-flow across the cell unit. If both the first fluid flow direction and the second fluid flow direction are reversed (relative to that indicated by the arrows in FIG. 14b), then both fluids flow toward the centre of the cell unit in a co-flow arrangement.

FIG. 14c shows a variation on the arrangement of FIGS. 14a, 14b in which the second fluid is internally manifolded using second fluid end ports 745a and 745b. The second fluid end ports 745a,b are similar to those described previously with reference to FIG. 7. First fluid flow path 1405 and the first fluid flow direction are similar to that described with respect to FIG. 14b. Similarly, the second fluid flow path 1410 and the second fluid flow direction are similar to that described with respect to FIG. 14b.

The cell of FIG. 14 may be formed from a single continuous metal substrate plate supporting two areas of cell chemistry, which plate can be incorporated in a spacered or spacerless cell unit.

However, multiple metal substrates, each carrying respective cell chemistry regions, could be used to form a single cell unit if multiple, smaller coated substrates are beneficial for example for manufacturing reasons. In the case of two coated cell substrates, these may be joined together, for example, by butt welding at their abutted edges to form a single metal substrate with multiple cell regions which can then be incorporated into a coupon in the same way as described above.

Alternatively, multiple coated cell substrates need not be directly joined together but rather could be attached, for example, by stake welding or bracing, to either a spacer and interconnect, or just an interconnect with 3D features providing the fluid volume, to then form a cell unit, for example, with dedicated sealed fluid volumes for each separate respective cell chemistry region.

These and other features of the present invention have been described above purely by way of example. Modifications in detail may be made to the invention within the scope of the claims and particularly in respect of the shape of the fuel cell unit, the electrochemically active layers and the arrangement of the ports for the first and second fluids.

The invention claimed is:

1. A stack of rectangular, planar electrochemical cell units, each cell unit comprising:
    a separator plate separating a first fluid volume from a second fluid volume;
    a second fluid mid-port that is disposed midway along its length within or between one or more regions in which active cell chemistry layers are provided and is in fluid communication with the second fluid volume of the cell unit,
    wherein the second fluid mid-ports of the respective cell units align to form a fluid mid-passageway extending in the stack direction; and,
    wherein the stack is configured such that, in each second fluid volume, second fluid flow paths extend across the one or more regions in which active cell chemistry layers are provided between the second fluid mid-port and each respective opposed cell end; and
    wherein the second fluid volumes are defined by the separator plate having an elongate shaped feature that extends at least partially around the periphery of one of the regions in which active cell chemistry layers are provided to confine a fluid flow path within that region, wherein the elongate shaped feature comprises a feature in the separator plate that forms a protruding rib on one side of the separator plate and a channel on the other side of the separator plate.

2. The stack according to claim 1, wherein there are at least two separate regions in which active cell chemistry layers are provided in each cell unit, each region disposed between the second fluid mid-port and each opposed cell end.

3. The stack according to claim 1, wherein a dimension of the regions in which active cell chemistry layers are provided which is parallel to the fluid flow path and between the second fluid mid-port and one of the opposed ends of the cell unit is less than or equal to a dimension of the active cell chemistry region that is perpendicular to that fluid flow path.

4. The stack according to claim 1, wherein each cell unit has only one second fluid mid-port which is in fluid communication with the second fluid volume.

5. The stack according to claim 1, wherein each cell unit comprises at least first and second first fluid end ports respectively disposed at or near each opposed cell end, the respective first fluid end ports being aligned to define respective first and second internal, first fluid end passageways extending in the stack direction, whereby the mid and end first fluid passageways respectively form inlet and outlet passageways, or vice versa, within the stack for supply of a first fluid to the first fluid volume of each cell unit.

6. The stack according to claim 1, in which each cell unit further comprises at least one first fluid mid-port that is disposed midway along its length within or between the regions in which active cell chemistry layers are provided and is in fluid communication with the first fluid volume of the cell unit;
    wherein the first fluid mid-ports of the respective cell units align to form at least one first fluid mid-passageway extending in the stack direction; and,
    wherein the stack is configured such that, in each first fluid volume, respective first fluid flow paths extend across the regions in which one or more active cell chemistry layers are provided between the at least one first fluid mid-port and each respective opposed cell end.

7. The stack according to claim 6, wherein each cell unit comprises two first fluid mid-ports each in fluid communication with the first fluid volume and one second fluid mid-port in fluid communication with the second fluid volume, and optionally wherein the second fluid mid-port is disposed between the two first fluid mid-ports.

8. The stack according to claim 6, in which first fluid end passageways in fluid communication with the first fluid volume are provided that extend in the stack direction at or near each opposed stack end, these being internally manifolded passageways respectively defined by aligned first and second first fluid end ports within each cell unit, whilst second fluid end passageways in fluid communication with the second fluid volume are provided that extend in the stack direction at or near each opposed stack end, these being externally manifolded passageways beyond each cell unit.

9. The stack according to claim 1, wherein the second fluid mid-port is an inlet port.

10. The stack according to claim 1, in which the regions in which active cell chemistry layers are provided are wrapped around at least one of any mid-ports or end ports provided in the cell units.

11. The stack according to claim 1, wherein the second fluid volume is defined by a separator plate of an adjacent cell unit having an elongate, shaped feature that extends at least partially around the periphery of the region in which the active cell chemistry layers are provided to confine a fluid flow path within that region.

12. The stack according to claim 1, in which the cell unit comprises:
- a metal support plate carrying, on a first side thereof, the active cell chemistry layer(s) provided over a porous region;
- wherein the separator plate and the metal support plate overlie one another to form the cell unit;
- wherein:
  - at least one of the separator plate and the metal support plate comprises flanged perimeter features formed by pressing the plate to a concave configuration;
  - the separator plate and the metal support plate are directly adjoined at the flanged perimeter features to form the first fluid volume therebetween, optionally by welding;
  - at least one fluid port is provided in each of the separator plate and the metal support plate, these being aligned to form the first fluid passageway within the flanged perimeter features, each port being either the first fluid mid-port and/or a first fluid end port and in communication with the first fluid volume; and,
  - at least one of the separator plate and the metal support plate is provided with shaped port features formed around the at least one fluid port by pressing, which shaped port features extend towards the other plate, and elements of the shaped port features are spaced from one another to define fluid pathways between the elements from the port to enable passage of fluid from the at least one first fluid port to the first fluid volume.

13. The stack according to claim 12, wherein:
a further at least one fluid port is provided in each of the separator plate and the metal support plate, these being aligned to form a second fluid passageway within the flanged perimeter features, each port being either a second fluid mid-port and/or a second fluid end port and in communication with a second fluid volume on a second side of the metal support plate, wherein the second fluid passageway is sealed from the first fluid volume, optionally by the provision of a weld around the second fluid port, the port optionally being provided with an annular flange formed by pressing an annular region around the port in at least one of the separator plate and the metal support plate.

* * * * *